United States Patent
Hayashida

(10) Patent No.: US 9,494,373 B2
(45) Date of Patent: *Nov. 15, 2016

(54) HEAT PUMP OPERATION METHOD AND HEAT PUMP SYSTEM

(75) Inventor: Gaku Hayashida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 741 days.

This patent is subject to a terminal disclaimer.

(21) Appl. No.: 13/701,141

(22) PCT Filed: May 14, 2012

(86) PCT No.: PCT/JP2012/003140
§ 371 (c)(1),
(2), (4) Date: Nov. 30, 2012

(87) PCT Pub. No.: WO2012/169116
PCT Pub. Date: Dec. 13, 2012

(65) Prior Publication Data
US 2013/0140015 A1   Jun. 6, 2013

(30) Foreign Application Priority Data

Jun. 6, 2011 (JP) .................. 2011-126730

(51) Int. Cl.
G05B 21/00   (2006.01)
G05B 13/00   (2006.01)
(Continued)

(52) U.S. Cl.
CPC ........... *F28F 27/00* (2013.01); *F24D 11/0214* (2013.01); *F24D 19/1039* (2013.01); *H02J 3/14* (2013.01);
(Continued)

(58) Field of Classification Search
CPC ............ F28B 27/00; F24H 1/00; F24H 27/00; F24H 9/00; F24D 11/02; F25B 27/00;
(Continued)

(56) References Cited

U.S. PATENT DOCUMENTS

| 2011/0035070 A1 | 2/2011 | Kanai | |
| 2011/0238232 A1* | 9/2011 | Tomita | H02J 3/32 700/291 |

(Continued)

FOREIGN PATENT DOCUMENTS

| DE | 202010015217 | 3/2011 |
| EP | 2284382 | 2/2011 |

(Continued)

OTHER PUBLICATIONS

U.S. Appl. No. 13/700,886 to Gaku Hayashida, filed Nov. 29, 2012.
(Continued)

*Primary Examiner* — Mohammad Ali
*Assistant Examiner* — Md Azad
(74) *Attorney, Agent, or Firm* — Greenblum & Bernstein, P.L.C.

(57) ABSTRACT

A heat pump operation method includes: obtaining, on a per time unit basis, an amount of the power generated by the power generation device, an amount of the power consumed by the electric load, and surplus power which is a difference between the generated power and the load power; and controlling operation of the heat pump to cause the heat pump to generate heat using power adjusted to follow a per time unit increase or decrease in the surplus power. In the controlling, when an amount of change in the surplus power remains greater than a predetermined threshold value for a given period of time extending back from a present time, an extent to which the power consumed by the heat pump follows the surplus power is reduced.

26 Claims, 16 Drawing Sheets

(51) Int. Cl.
- *G05B 15/00* (2006.01)
- *G05D 3/12* (2006.01)
- *G05D 5/00* (2006.01)
- *G05D 9/00* (2006.01)
- *G05D 11/00* (2006.01)
- *G05D 13/00* (2006.01)
- *F24D 11/02* (2006.01)
- *F25B 29/00* (2006.01)
- *F17D 1/00* (2006.01)
- *F28F 27/00* (2006.01)
- *F24D 19/10* (2006.01)
- *H02J 3/14* (2006.01)
- *H02J 3/38* (2006.01)

(52) U.S. Cl.
CPC ............... *H02J 3/383* (2013.01); *H02J 3/386* (2013.01); *F24D 2200/02* (2013.01); *F24D 2200/12* (2013.01); *H02J 3/387* (2013.01); *Y02B 30/126* (2013.01); *Y02B 30/762* (2013.01); *Y02B 70/3225* (2013.01); *Y02B 70/3275* (2013.01); *Y02E 10/563* (2013.01); *Y02E 10/763* (2013.01); *Y04S 20/222* (2013.01); *Y04S 20/244* (2013.01)

(58) Field of Classification Search
CPC ............ F25B 30/00; F25B 49/00; H02J 4/00; H02J 1/10; G06F 1/26; G06F 1/28; G06F 1/30; G06F 7/06; G06Q 50/06; F01K 17/02
USPC ................. 700/282–295; 705/412; 713/320; 429/50, 105; 307/11, 43, 64; 290/2; 237/2; 165/200, 287
See application file for complete search history.

(56) References Cited

U.S. PATENT DOCUMENTS

| | | | |
|---|---|---|---|
| 2011/0291479 A1* | 12/2011 | Lee | H02J 3/32 307/43 |
| 2012/0072040 A1* | 3/2012 | Kaji | 700/291 |
| 2012/0078433 A1 | 3/2012 | Honma et al. | |
| 2012/0205456 A1* | 8/2012 | Honma | F24D 19/1048 237/2 B |
| 2012/0232706 A1 | 9/2012 | Hayashida | |
| 2012/0233094 A1* | 9/2012 | Mise | G06Q 30/06 705/412 |
| 2012/0235478 A1 | 9/2012 | Hayashida | |

FOREIGN PATENT DOCUMENTS

| | | |
|---|---|---|
| JP | 2004-194485 | 7/2004 |
| JP | 2006-158027 | 6/2006 |
| JP | 2008-002702 | 1/2008 |
| JP | 2010-288375 | 12/2010 |

OTHER PUBLICATIONS

U.S. Appl. No. 13/701,103 to Gaku Hayashida, filed Nov. 30, 2012.
Search report from E.P.O. in European Patent Application No. 12790389.6, mail date is May 30, 2014.

* cited by examiner

FIG. 4

First control table

| | | | | | | ... |
|---|---|---|---|---|---|---|
| Input information | Inlet water temperature [°C] | 10 | 10 | 10 | 10 | ... |
| | Ambient temperature [°C] | 10 | 10 | 10 | 10 | ... |
| | Heated water temperature [°C] | 60 | 65 | 70 | 75 | ... |
| Output information | Compressor frequency [Hz] | 70 | 73 | 77 | 80 | ... |
| | Expansion valve aperture [pulse] | 200 | 203 | 209 | 213 | ... |
| | Pump flow rate [L/min] | 10.2 | 10.4 | 10.6 | 10.7 | ... |

FIG. 5

Second control table

| | Power consumption command value [W] | 500 | 500 | 500 | 500 | 500 | ... | 550 | 550 | 550 | 550 | 550 | ... |
|---|---|---|---|---|---|---|---|---|---|---|---|---|---|
| Input information | Inlet water temperature [°C] | 10 | 10 | 10 | 10 | 10 | ... | 10 | 10 | 10 | 10 | 10 | ... |
| | Ambient temperature [°C] | 10 | 10 | 10 | 10 | 10 | ... | 10 | 10 | 10 | 10 | 10 | ... |
| | Heated water temperature [°C] | 60 | 65 | 70 | 75 | 50 | ... | 60 | 65 | 70 | 75 | 70 | ... |
| Output information | Compressor frequency [Hz] | 40 | 43 | 47 | 50 | | ... | 60 | 63 | 67 | 70 | | ... |
| | Expansion valve aperture [pulse] | 190 | 193 | 199 | 203 | | ... | 210 | 213 | 219 | 223 | | ... |
| | Pump flow rate [L/min] | 7.2 | 7.4 | 7.6 | 7.7 | | ... | 9.2 | 9.4 | 9.6 | 9.7 | | ... |

FIG. 8

| Time | Load power [W] | PV-generated power [W] | Surplus power [W] | Power consumption command value [W] |
|---|---|---|---|---|
| 1 min. before | 850 | 1100 | 350 | 0 |
| 9 min. before | 1200 | 1120 | 0 | 0 |
| 10 min. before | 300 | 1310 | 1010 | 1000 |
| 11 min. before | 300 | 1150 | 850 | 850 |
| 12 min. before | 730 | 1380 | 650 | 650 |
| 13 min. before | 680 | 1160 | 500 | 500 |
| 14 min. before | 550 | 1200 | 650 | 650 |
| 15 min. before | 440 | 1190 | 750 | 750 |
| 16 min. before | 300 | 1150 | 850 | 850 |
| 17 min. before | 320 | 1120 | 800 | 800 |
| 18 min. before | 340 | 1180 | 840 | 0 |
| 30 min. before | 200 | 1220 | 1020 | 1000 |

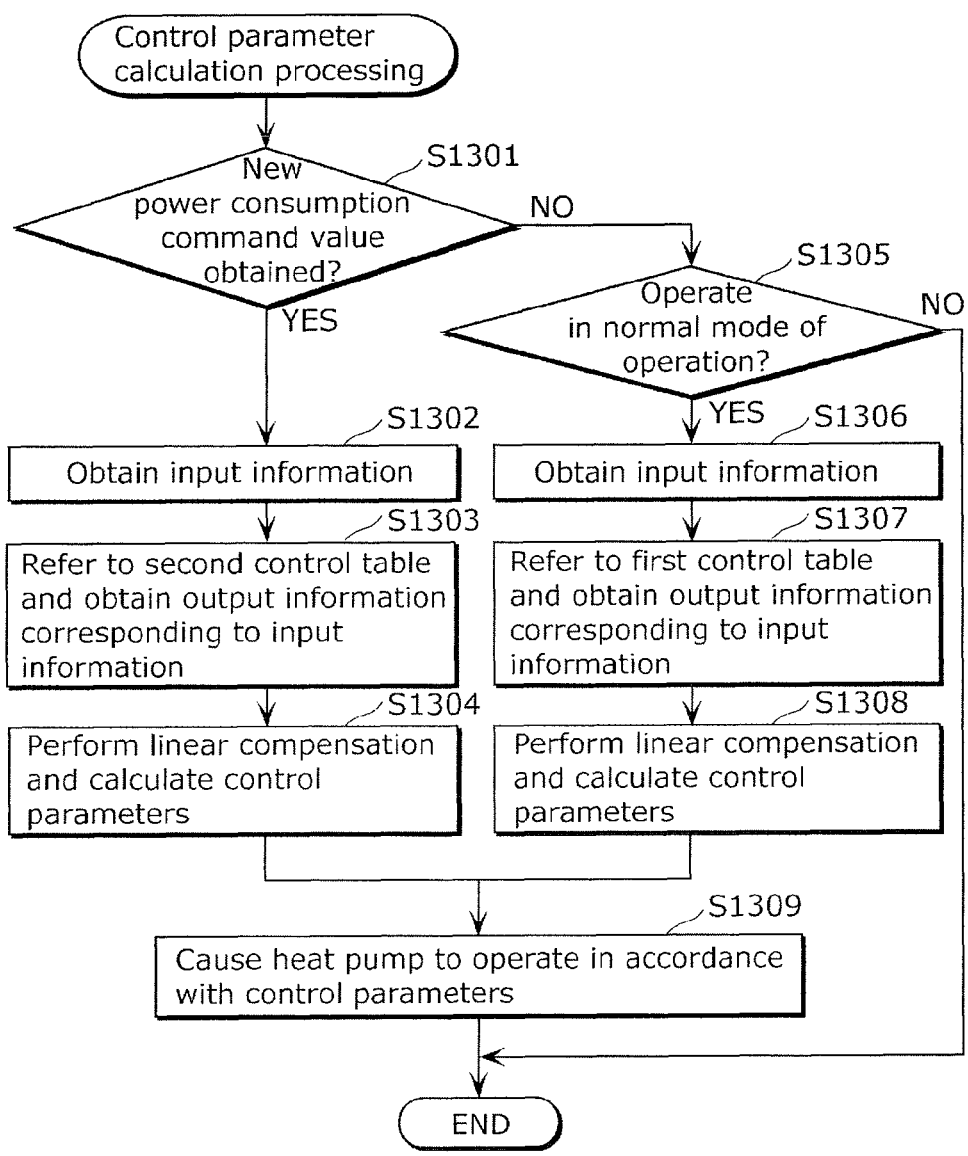

FIG. 12B

Second control table

| | Power consumption command value [W] | 1000 | 1000 | 1000 | 1000 | 1000 |
|---|---|---|---|---|---|---|
| Input information | Inlet water temperature [°C] | 10 | 10 | 15 | 15 | 15 |
| | Ambient temperature [°C] | 10 | 15 | 10 | 10 | 15 |
| Output information | Heated water temperature [°C] | 70 | 70 | 70 | 70 | 70 |
| | Compressor frequency [Hz] | 70 | 75 | 80 | 80 | 85 |
| | Expansion valve aperture [pulse] | 200 | 210 | 210 | 210 | 220 |
| | Pump flow rate [L/min] | 10 | 12 | 11 | 11 | 13 |

FIG. 13A

| | Power consumption command value [W] | 1000 | 1000 |
|---|---|---|---|
| Input information | Inlet water temperature [°C] | 10 | 15 |
| | Ambient temperature [°C] | 11 | 11 |
| | Heated water temperature [°C] | 70 | 70 |
| Output information | Compressor frequency [Hz] | 71 | 81 |
| | Expansion valve aperture [pulse] | 202 | 212 |
| | Pump flow rate [L/min] | 10.4 | 11.4 |

FIG. 13B

| | Power consumption command value [W] | 1000 |
|---|---|---|
| Input information | Inlet water temperature [°C] | 13 |
| | Ambient temperature [°C] | 11 |
| | Heated water temperature [°C] | 70 |
| Output information | Compressor frequency [Hz] | 77 |
| | Expansion valve aperture [pulse] | 208 |
| | Pump flow rate [L/min] | 11 |

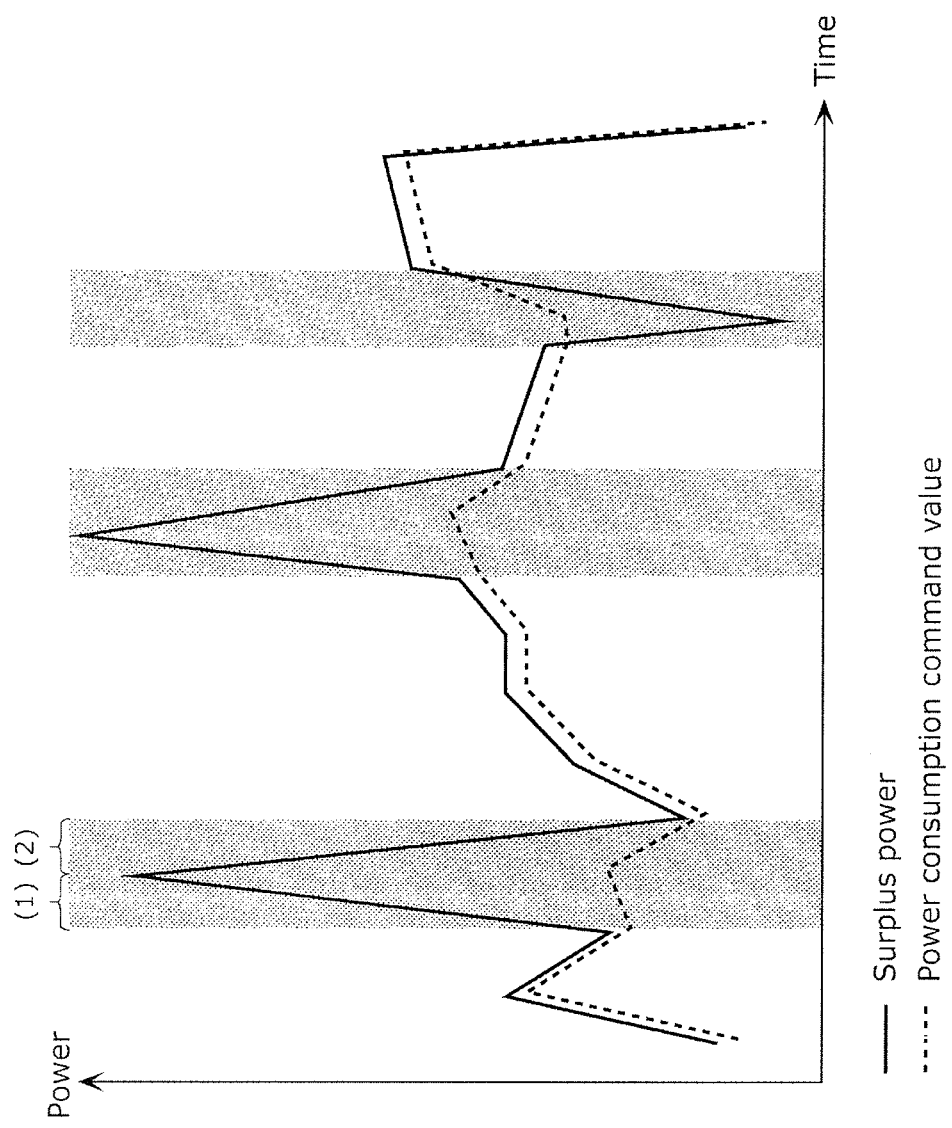

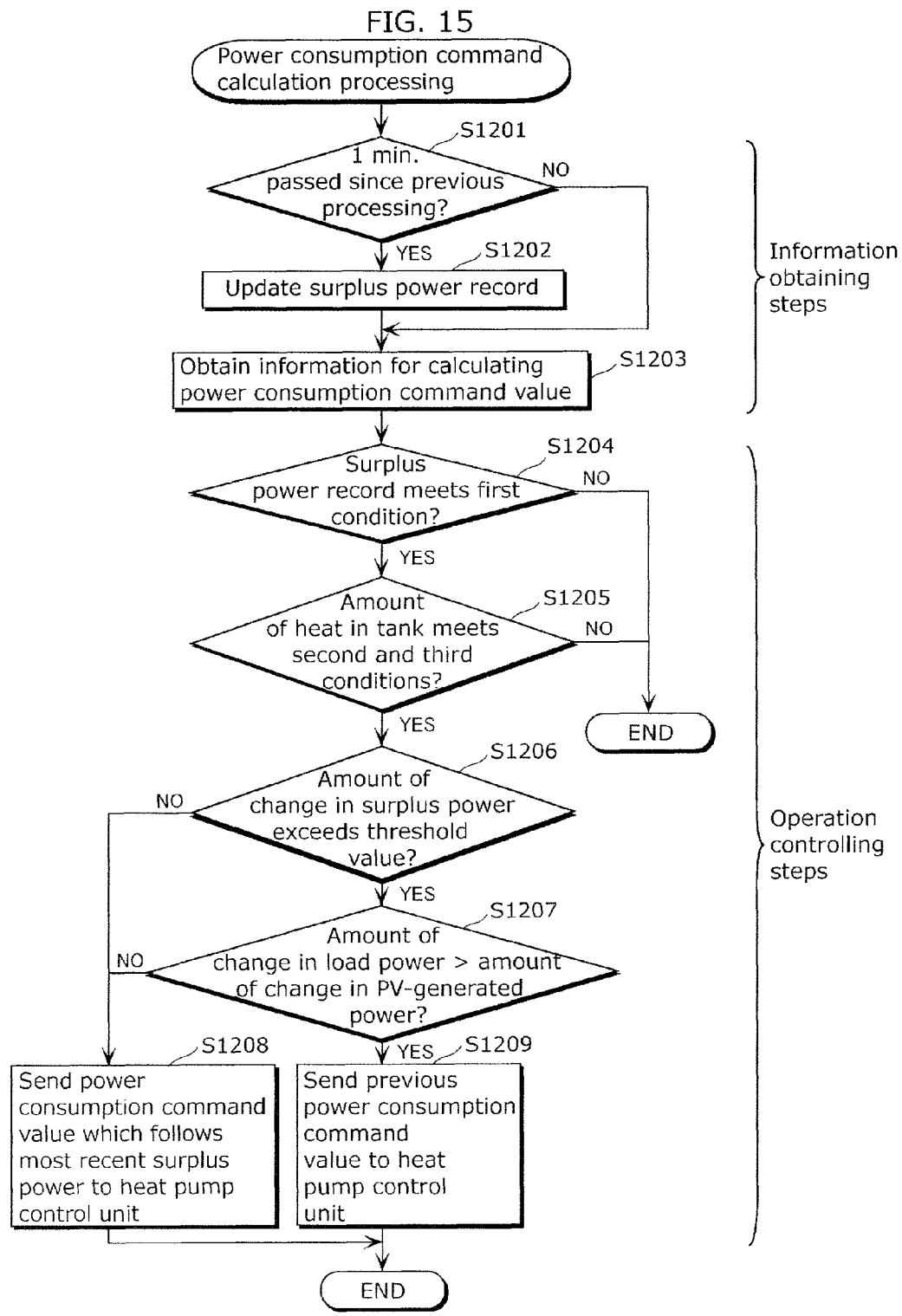

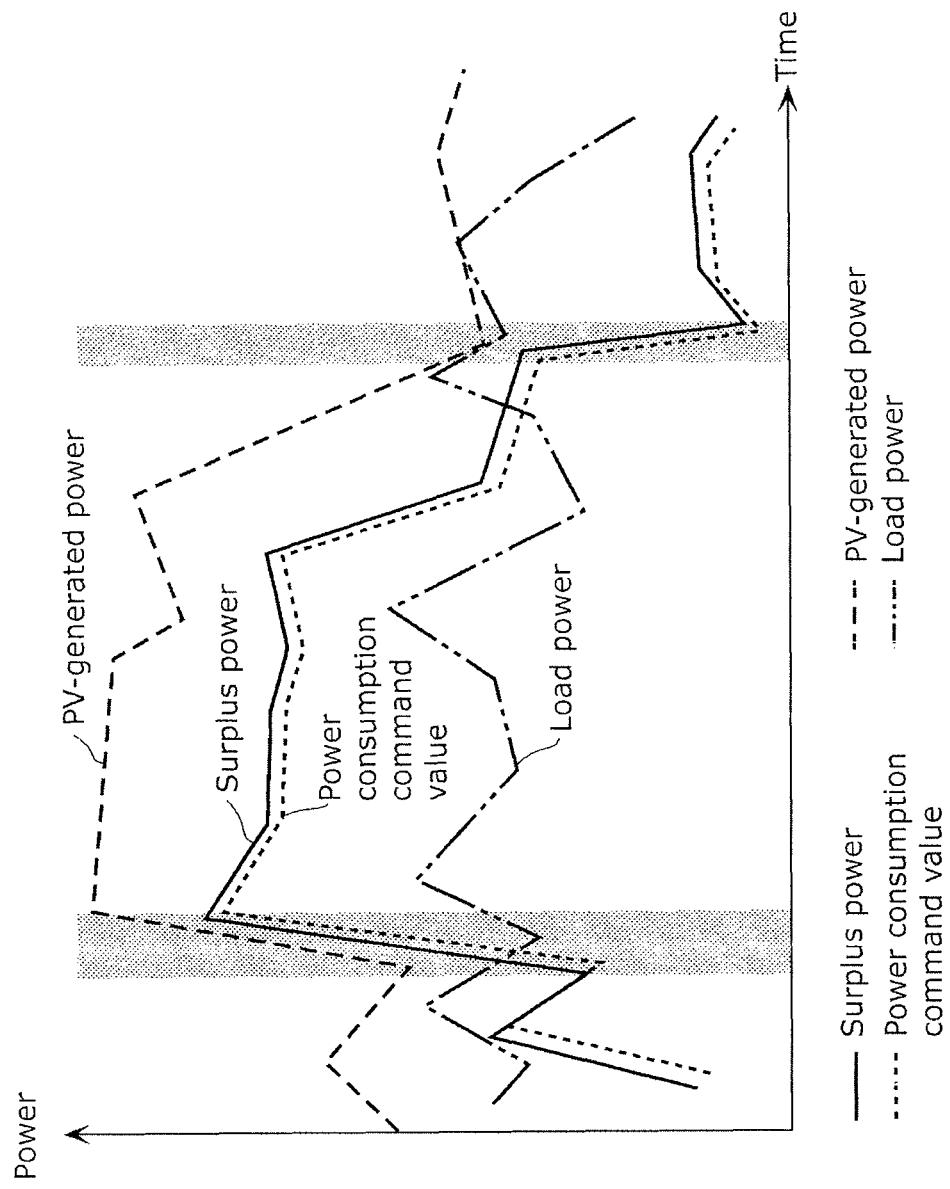

HEAT PUMP OPERATION METHOD AND HEAT PUMP SYSTEM

TECHNICAL FIELD

The present invention relates to a heat pump system including a power generation device such as a photovoltaic device and a device which consumes power such as a heat pump.

BACKGROUND ART

Power generation devices, such as solar or wind power generation devices, are devices designed to generate power. A photovoltaic device generates power by transforming solar energy into electricity and supplies the power to a home as a natural source of energy. The amount of power generated by a photovoltaic device constantly fluctuates with weather and meteorological conditions.

A heat pump hot water supply device heats a refrigerant by absorbing heat from the atmosphere and compressing the refrigerant using electricity. The heat is then transferred to the water via a heat exchanger, creating hot water. The heat pump hot water supply device uses less energy than a conventional electric hot water heater.

A heat pump hot water supply system including a power generation device includes a combination of the above devices, and supplies a consumer with power and heat. An example of this type of conventional heat pump hot water supply system including a power generation device is disclosed in Patent Literature (PTL) 1.

PTL 1 discloses a heat pump hot water supply system which obtains weather forecast information from a server using a weather information obtaining unit. When the obtained information meets a predetermined condition, the heat pump hot water supply system switches to use photovoltaic power to heat the water in the CO2 heat pump hot water supply device instead of late night power from a commercial power source. Operating using power harnessed from natural energy allows for a power efficient, low-energy electric heat pump hot water supply device which can reduce electricity costs.

CITATION LIST

Patent Literature

[PTL 1] Japanese Unexamined Patent Application Publication No. 2008-2702
[PTL 2] Japanese Unexamined Patent Application Publication No. 2006-158027

SUMMARY OF INVENTION

Technical Problem

However, with the techniques disclosed in PTL 1, reverse power is generated when the power consumption of the heat pump hot water supply system drops below the generated amount of photovoltaic power. As a result, there is a possibility that the power grid will become unstable.

The present invention was conceived to solve the above-described problem and aims to provide a heat pump operation method and heat pump system which contribute to the stabilization of the power grid by reducing reverse power without sacrificing economics.

Solution to Problem

The heat pump operation method according to an aspect of the present invention is a heat pump operation method for use in a system which includes a power generation device, an electric load which operates using power generated by the power generation device, and a heat pump which generates heat using the power generated by the power generation device. Specifically, the heat pump operation method includes: obtaining, on a per time unit basis, generated power which is an amount of the power generated by the power generation device, load power which is an amount of the power consumed by the electric load, and surplus power which is a difference between the generated power and the load power; and controlling operation of the heat pump to cause the heat pump to generate heat using power adjusted to follow a per time unit increase or decrease in the surplus power. In the controlling, when an amount of change in the surplus power remains greater than a predetermined threshold value for a given period of time extending back from a present time, an extent to which the power consumed by the heat pump follows the surplus power is reduced.

It is to be noted that general or specific embodiments may be realized as a system, method, integrated circuit, computer program, storage media, or any elective combination thereof.

Advantageous Effects of Invention

With the present invention, a small amount of reverse flow or purchase of power is permitted in exchange for the prevention of rapid fluctuations in heat pump load power, which is achieved by reducing the extent to which the power consumed by the heat pump follows the surplus power in a period of rapid change in surplus power, resulting in stable operation of the heat pump.

BRIEF DESCRIPTION OF DRAWINGS

FIG. 4 is an example of a first control table.

FIG. 5 is an example of a second control table.

FIG. 8 is an example of a surplus power record.

FIG. 11 is a flowchart of control parameter calculation processes performed by the heat pump control unit.

FIG. 12A is an example of input information.

FIG. 12B is an example of a second control table.

FIG. 13A shows a result of the first linear interpolation.

FIG. 13B shows a result of the second linear interpolation.

FIG. 14 illustrates the relationship between the change in surplus power and the calculated power consumption command value.

FIG. 15 is a flowchart of other processes performed by the HP control device related to the calculation of power consumption command values.

FIG. 17 is a graph illustrating a situation when "no" is determined in S1207 in FIG. 15.

DESCRIPTION OF EMBODIMENTS

Figure 1:
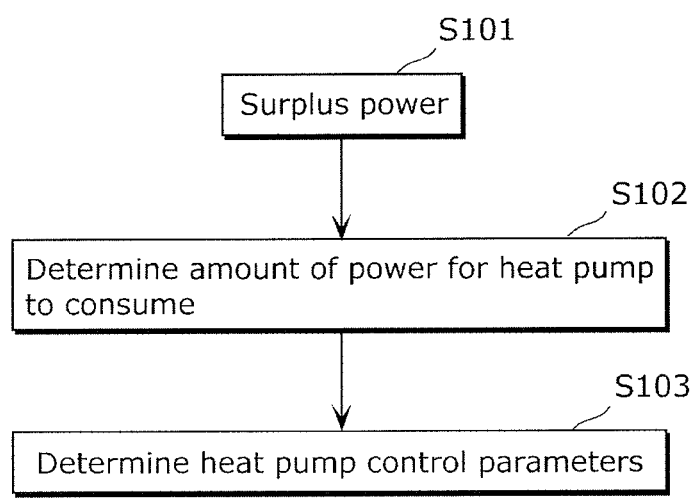
FIG. 1 is a diagram outlining the processes performed by the heat pump hot water supply system according to the first embodiment of the present invention.

Underlying Knowledge Forming Basis of the Present Invention

With the conventional heat pump hot water supply system disclosed in PTL 1, an amount of surplus power, which is calculated from the constantly fluctuating amount of power generated by the photovoltaic device and the electric load of the consumer, is not taken into account in the determination of the power to be consumed by the heat pump hot water supply device. As the number of homes generating surplus power increases with the growing prevalence of photovoltaic power generation, the voltage of a power grid will increase when reverse power is simultaneously generated, causing the power grid to become unstable. Moreover, the consumer, who is located on the downstream side of the power grid, cannot flow reverse power when the voltage of the power grid is high, so the output thereof must be inhibited, causing the surplus power generated by the photovoltaic device to go to waste.

Moreover, the voltage of the reverse power is converted according to the electricity distribution system which causes a significant conversion loss in the process. Transmitting the power to another consumer also causes a transmission loss in the process as well. As such, it is more environmental for the consumer to consume the generated power on location.

Furthermore, with the device proposed in PTL 2, the heat pump unit is operated when the amount of generated power exceeds the amount of power used. With this operation, the power consumption of the heat pump unit exceeds the surplus power, resulting in the purchase of an insufficient amount of power. As a result, hot water that has been heated with purchased power in addition to surplus power is stored in a tank having a limited hot water storage capacity, whereby a decrease in the reverse flow of power to the power grid cannot be efficiently realized. Moreover, the cost of power will increase due to the purchase of power during the daytime, when electricity rates are high.

In order to solve the above-described problem, the heat pump operation method according to an aspect of the present invention is a heat pump operation method for use in a system which includes a power generation device, an electric load which operates using power generated by the power generation device, and a heat pump which generates heat using the power generated by the power generation device. Specifically, the heat pump operation method includes: obtaining, on a per time unit basis, generated power which is an amount of the power generated by the power generation device, load power which is an amount of the power consumed by the electric load, and surplus power which is a difference between the generated power and the load power; and controlling operation of the heat pump to cause the heat pump to generate heat using power adjusted to follow a per time unit increase or decrease in the surplus power. In the controlling, when an amount of change in the surplus power remains greater than a predetermined threshold value for a given period of time extending back from a present time, an extent to which the power consumed by the heat pump follows the surplus power is reduced.

With this, by reducing the extent to which the power consumed by the heat pump follows the surplus power in a period of abrupt change in surplus power, heat pump load power is kept from abruptly fluctuating in exchange for permitting a small amount of reverse flow or purchase of power, resulting in stable operation of the heat pump.

Moreover, in the controlling, the extent to which the power consumed by the heat pump follows the surplus power may be reduced when (i) the amount of change in the surplus power remains greater than the predetermined threshold value for the given period of time extending back from a present time and (ii) an amount of change in the load power is greater than an amount of change in the generated power With this, by also taking into consideration the cause of the fluctuations in surplus power when controlling the extent to which the power consumption command value follows the surplus power, both the efficient consumption of surplus power while inhibiting the purchase of power and the stable operation of the heat pump can be achieved.

Moreover, in the controlling, the operation of the heat pump may be controlled to approximate the power consumed by the heat pump to the surplus power last obtained.

Moreover, in the controlling, the operation of the heat pump is controlled to cause the heat pump to consume an amount of power adjusted to follow the surplus power obtained on a per time unit basis when a first condition is met, the first condition being that the surplus power remains greater than a predetermined threshold value for the given period of time extending back from a present time.

When conventional heat pumps are caused to operate using a reduced amount of power, the heat generation efficiently drastically decreases. Moreover, some time is required for the heat pump to go from a stopped state to a state of highly efficient operation. For that reason, as described above, it is preferable that the power consumed by the heat pump is made to follow the surplus power only when (i) the amount of surplus power is great enough for the heat pump to operate in a highly efficient manner, and (ii) it can be assured that the surplus power will be continuously supplied until the operation of the heat pump stabilizes.

Furthermore, in the obtaining, an amount of heat in a water storage tank which stores hot water heated by the heat generated by the heat pump may be obtained on a per unit time basis. Then, in the controlling, the operation of the heat pump may be controlled to cause the heat pump to consume an amount of power adjusted to follow the surplus power obtained on a per time unit basis when a second condition is met in addition to the first condition, the second condition being that the amount of heat in the water storage tank last obtained is less than or equal to a predetermined upper limit.

Moreover, in the controlling, the operation of the heat pump may be controlled to cause the heat pump to consume an amount of power adjusted to follow the surplus power obtained on a per time unit basis when a third condition is met in addition to the first condition and the second condition, the third condition being that the amount of heat in the water storage tank last obtained is greater than a predetermined lower limit.

Even if the heat pump is caused to operate when the amount of heat in the water storage tank exceeds the upper limit, generated heat cannot be stored. Moreover, there is a need to cause the heat pump to operate rapidly in order to store heat in the water storage tank when the amount of heat in the water storage tank is greater than or equal to the lower limit, regardless of the presence or absence of surplus power. It is for this reason that it is preferable to cause the heat pump to consume power in accordance with the surplus power only when the above-described second and third conditions are met.

Moreover, the system may include the heat pump which generates heat, a water storage tank which stores hot water, and a heat exchanger which heats the hot water stored in the water storage tank with the heat generated by the heat pump. In the controlling, an ambient temperature which is a temperature surrounding the heat pump, an inlet water temperature which is a temperature of the hot water flowing through the heat exchanger from the water storage tank, and a heated water temperature which is a temperature of the hot water supplied to the water storage tank from the heat exchanger may be obtained, control parameters may be obtained, the control parameters being necessary for, when the temperature surrounding the heat pump is the ambient temperature, (i) causing the heat pump to consume power adjusted to follow the surplus power obtained on a per unit time basis, and (ii) causing the heat pump to increase the temperature of the hot water from the inlet water temperature to the heated water temperature, and the operation of the heat pump may be controlled according to the obtained control parameters.

Moreover, in the controlling, the control parameters corresponding to input information including the amount of power consumed by the heat pump, the ambient temperature, the inlet water temperature, and the heated water temperature, may be obtained by referring to a control table holding the input information and the control parameters corresponding to a combination of the input information.

Moreover, discrete values of the input information may be held in the control table. In the controlling, when the combination of the obtained input information is not held in the control table, the control parameters corresponding to the combination of the obtained input information may be obtained by linear interpolation based on a plurality of the control parameters held in the control table.

Moreover, in the controlling, when at least one of the first condition, the second condition, and the third condition is not met, the operation of the heat pump may be controlled to cause the heat pump to consume an amount of power comparable to a rated power of the heat pump.

A heat pump operation method according to another aspect of the present invention is a heat pump operation method for use in a system which includes a power generation device, an electric load which operates using power generated by the power generation device, and a heat pump which generates heat using the power generated by the power generation device. Specifically, the heat pump operation method includes: obtaining generated power which is an amount of the power generated by the power generation device, load power which is an amount of the power consumed by the electric load, and surplus power which is a difference between the generated power and the load power; and controlling operation of the heat pump by transmitting, to the heat pump, an amount of power to be consumed by the heat pump for generating heat as a power consumption command value. In the controlling, the power consumption command value is calculated to follow the surplus power when the surplus power remains greater than or equal to a threshold value for a given period of time or longer, when, furthermore, an amount of change in the surplus power is greater than a threshold value, a power consumption command value previous to the calculated power consumption command value is transmitted to the heat pump as a second power consumption value, and when the amount of change in the surplus power is less than or equal to the threshold value, the calculated power consumption command value is transmitted to the heat pump as the second power consumption command value.

Moreover, when the power consumption command value is not obtained, control parameters may be calculated using a first control table, and when the power consumption command value is obtained, control parameters may be calculated using a second control table which holds the power consumption command value.

The heat pump system according to an aspect of the present invention includes a power generation device, an electric load which operates using power generated by the power generation device, and a heat pump which generates heat using the power generated by the power generation device. The heat pump system further includes: an information obtaining unit configured to obtain, on a per time unit basis, generated power which is an amount of the power generated by the power generation device, load power which is an amount of the power consumed by the electric load, and surplus power which is a difference between the generated power and the load power; and an operation control unit configured to cause the heat pump to generate heat using power adjusted to follow a per time unit increase or decrease in the surplus power. The operation control unit is further configured to, when an amount of change in the surplus power remains greater than a predetermined threshold value for a given period of time extending back from a present time, reduce an extent to which the power consumed by the heat pump follows the surplus power.

Moreover, the operation control unit may be configured to reduce the extent to which the power consumed by the heat pump follows the surplus power when (i) the amount of change in the surplus power remains greater than the predetermined threshold value for the given period of time extending back from a present time and (ii) an amount of change in the load power is greater than an amount of change in the generated power.

Moreover, the operation control unit may be configured to control the operation of the heat pump to approximate the power consumed by the heat pump to the surplus power last obtained.

Moreover, the operation control unit may be configured to control the operation of the heat pump to cause the heat pump to consume an amount of power adjusted to follow the surplus power obtained on a per time unit basis when a first condition is met, the first condition being that the surplus power remains greater than a predetermined threshold value for a given period of time extending back from a present time.

Furthermore, the information obtaining unit may further be configured to obtain, on a per unit time basis, an amount of heat in a water storage tank which stores hot water heated by the heat generated by the heat pump, and the operation control unit may be configured to control the operation of the heat pump to cause the heat pump to consume an amount of power adjusted to follow the surplus power obtained on a per time unit basis when a second condition is met in addition to the first condition, the second condition being that the amount of heat in the water storage tank last obtained is less than or equal to a predetermined upper limit.

Furthermore, the operation control unit may be configured to control the operation of the heat pump to cause the heat pump to consume an amount of power adjusted to follow the surplus power obtained on a per time unit basis when a third condition is met in addition to the first condition and the second condition, the third condition being that the amount of heat in the water storage tank last obtained is greater than a predetermined lower limit.

Moreover, the heat pump system may further include: the heat pump which generates heat, a water storage tank which stores hot water, and a heat exchanger which heats the hot water stored in the water storage tank with the heat generated by the heat pump. The operation control unit may further be configured to: obtain an ambient temperature which is a temperature surrounding the heat pump, an inlet water temperature which is a temperature of the hot water flowing through the heat exchanger from the water storage tank, and a heated water temperature which is a temperature of the hot water supplied to the water storage tank from the heat exchanger; obtain control parameters, the control parameters being necessary for, when the temperature surrounding the heat pump is the ambient temperature, (i) causing the heat pump to consume power adjusted to follow the surplus power obtained on a per unit time basis, and (ii) causing the heat pump to increase the temperature of the hot water from the inlet water temperature to the heated water temperature; and control the operation of the heat pump according to the obtained control parameters.

Moreover, the operation control unit may be configured to obtain the control parameters corresponding to input information including the amount of power consumed by the heat pump, the ambient temperature, the inlet water temperature, and the heated water temperature, by referring to a control table holding the input information and the control parameters corresponding to a combination of the input information.

Moreover, discrete values of the input information may be held in the control table. The operation control unit may configured to, when the combination of the obtained input information is not held in the control table, obtain the control parameters which correspond to the combination of the obtained input information by linear interpolation based on a plurality of the control parameters held in the control table.

Moreover, the operation control unit may be configured to control the operation of the heat pump to cause the heat pump to consume an amount of power comparable to a rated power of the heat pump when at least one of the first condition, the second condition, and the third condition is not met.

Moreover, the heat pump system may include: a heat pump hot water supply device which includes the heat pump, a water storage tank which stores hot water, a heat exchanger which heats the hot water stored in the water storage tank with the heat generated by the heat pump, and a heat pump control unit; and a heat pump (HP) control device which includes the information obtaining unit and the operation control unit, and which is structurally separate from the heat pump hot water supply device.

With the foregoing configuration, the HP control device can be caused to control not only the heat pump hot water supply device, but other electronic devices as well. Moreover, when used in an environment in which control of power consumption is not necessary, it is suitable to install simply the heat pump hot water supply device.

A heat pump system according to another aspect of the present invention includes: a heat pump which generates heat using power generated by a power generation device; and a heat pump (HP) control device which controls the heat pump. The HP control device includes: an information obtaining unit configured to obtain an amount of the power generated by the power generation device, an amount of load power, and a status of a power grid; and an operation control unit configured to calculate a power consumption command value using a value of surplus power calculated based on the amount of power generated and the amount of load power. The operation control unit is further configured to: calculate the power consumption command value to follow the surplus power when the surplus power remains greater than or equal to a threshold value for a given period of time or longer; when, furthermore, an amount of change in the surplus power is greater than a threshold value, transmit a power consumption command value previous to the calculated power consumption command value to the heat pump as a second power consumption command value; and when the amount of change in the surplus power is less than or equal to the threshold value, transmit the calculated power consumption command value as the second power consumption command value to the heat pump.

Moreover, The heat pump system may further include a power distribution device, wherein the power distribution device may transmit the amount of power generated and the amount of load power to the information obtaining unit included in the HP control device.

Furthermore, the heat pump system further includes an HP hot water supply device including the heat pump and an HP control unit. The HP control unit may include a first control table for calculating operation parameters based on the power consumption command value and a second control table for calculating operation control parameters based on rated operation.

It is to be noted that general or specific embodiments may be realized as a system, method, integrated circuit, computer program, storage media, or any elective combination thereof.

First Embodiment

Hereinafter, embodiments of present invention are described with reference to the drawings. It is to be noted that each of the embodiments described below shows a specific example of the present invention. The numerical values, shapes, materials, structural elements, the arrangement and connection of the structural elements, steps, the processing order of the steps etc. shown in the following exemplary embodiments are mere examples, and therefore do not limit the present invention. Moreover, among the structural elements in the following exemplary embodiments, structural elements not recited in any one of the independent claims defining the most generic part of the inventive concept are described as arbitrary structural elements.

FIG. 1 is a flow chart outlining the processes of the heat pump hot water supply system according to the first embodiment of the present invention.

As FIG. 1 shows, firstly, the heat pump hot water supply system according to the first embodiment obtains surplus power (S101) which is the amount of power generated by the photovoltaic device (PV-generated power) remaining after power to be consumed within the home has been allotted for. Next, the heat pump hot water supply system determines, taking into account the surplus power, a given amount of power for the heat pump to consume and operate at (S102). The heat pump hot water supply system then determines heat pump control parameters for the consumption of the determined power, and causes the heat pump to operate in accordance with the control parameters (S103).

In this way, the heat pump operates such that it consumes an amount of power close to the surplus power, resulting in a decrease in the amount of reverse power sent to the power grid and a cost-effective mode of operation.

Figure 2:
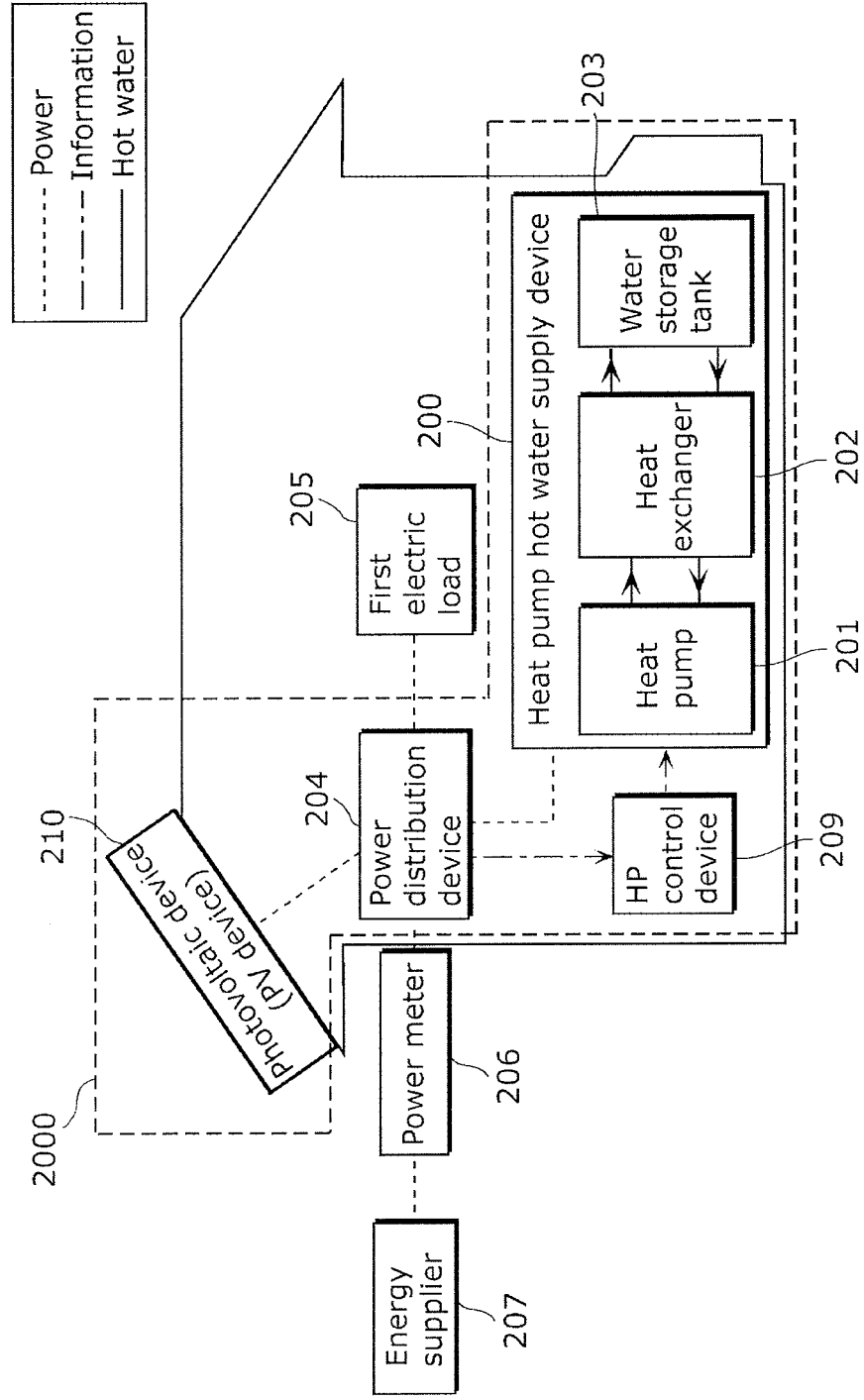
FIG. 2 is a diagram showing the configuration of the heat pump hot water supply system according to the first embodiment of the present invention.

FIG. 2 is a block diagram explaining a heat pump hot water supply system 2000 including the power generation device. As shown in FIG. 2, the heat pump hot water supply system 2000 according to the first embodiment includes a heat pump hot water supply device 200, a power distribution device 204, a HP control device 209, and a photovoltaic device 210. The power distribution device 204 is connected to a first electric load 205 and a power meter 206 via an energy supplier 207.

The energy supplier 207 (source of electric power) as shown in FIG. 2 supplies power via a power grid to homes. The power grid is a network that provides a stable supply of power. The power meter 206 measures the amount of power supplied via the power grid that is consumed in a home. Moreover, the power meter 206 is configured to sell excess power generated by the photovoltaic device 210 that is not consumed in the home to the power grid.

The house shown in FIG. 2 is equipped with the first electric load 205, the heat pump hot water supply device 200 (the second electric load), the HP control device 209, the photovoltaic device 210, and the power distribution device 204.

The heat pump hot water supply device 200 includes at least a heat pump (heat generation unit) 201, a heat exchanger 202, and a water storage tank (heat storage unit) 203. The heat generated by the heat pump 201 is temporarily stored in the water storage tank 203, and the hot water inside the water storage tank 203 is radiated according to a user's request. That is, the heat pump hot water supply device 200 radiates heat generated by the heat generation unit and stored in the heat storage unit.

The photovoltaic device 210 is a device which converts energy from the sun into electric power. The photovoltaic device 210 converts energy from the sun into electric power and outputs the converted power (PV-generated power) to the power distribution device 204.

The power distribution device 204 obtains power from the photovoltaic device 210 and the energy supplier (commercial power source) 207, and distributes the power to the heat pump hot water supply device 200 and the first electric load 205 on demand. The heat pump hot water supply device 200 can operate off power from the photovoltaic device 210 as well as off power bought from the energy supplier 207 (grid power). Moreover, the power distribution device 204 can measure the amount of power distributed to the heat pump hot water supply device 200 and the first electric load 205, that is, the amount of power consumed by the heat pump hot water supply device 200 and the first electric load 205.

The power distribution device 204 obtains the PV-generated power from the photovoltaic device 210. Moreover, the power distribution device 204 measures load power, which is the amount of power consumed by the first electric load 205, and heat pump load power, which is the amount of power consumed by the heat pump hot water supply device 200. When the sum of the load power and the heat pump load power exceeds the PV-generated power, power purchased from the power grid is obtained via the power meter 206. That is, the power distribution device 204 obtains purchased power and PV-generated power, then supplies heat pump load power to the heat pump hot water supply device 200, and load power to the first electric load 205. Moreover, when the PV-generated power exceeds the sum of the load power and the heat pump load power, surplus power can be transmitted as reverse power and sold to the energy supplier 207.

Moreover, the power distribution device 204 can inhibit the output of PV-generated power corresponding to the surplus power when the voltage of the power grid is high and the reverse flow of surplus power is not possible. More specifically, the power distribution device 204 stops the supply (selling) of power to the energy supplier 207 via the power meter 206 when the voltage of the power grid exceeds a threshold value (for example, 107 V).

The power distribution device 204 also includes a converter and inverter which, when obtained power is transmitted as described above, converts the voltage and performs AC-DC and DC-AC conversion of the obtained power accordingly so the obtained power conforms to the transmitted power. Moreover, the power distribution device 204 transmits the load power actually consumed by the first electric load 205 and the PV-generated power actually generated by the photovoltaic device 210 to the HP control device 209 at regular time intervals.

The energy supplier 207 supplies purchased power at the demand of the power distribution device 204 installed in the consumer's home. Additionally, when reverse power is input from the power distribution device 204, the energy supplier 207 transmits that power via the power grid to other homes of consumers.

The first electric load 205 is an electric load inside the home of a consumer, and refers to appliances such as televisions, air conditioners, refrigerators, washing machines, or lights which operate by using power supplied from the power distribution device 204. Furthermore, the sum total of the power used by these appliances is defined herein as load power.

Figure 3:
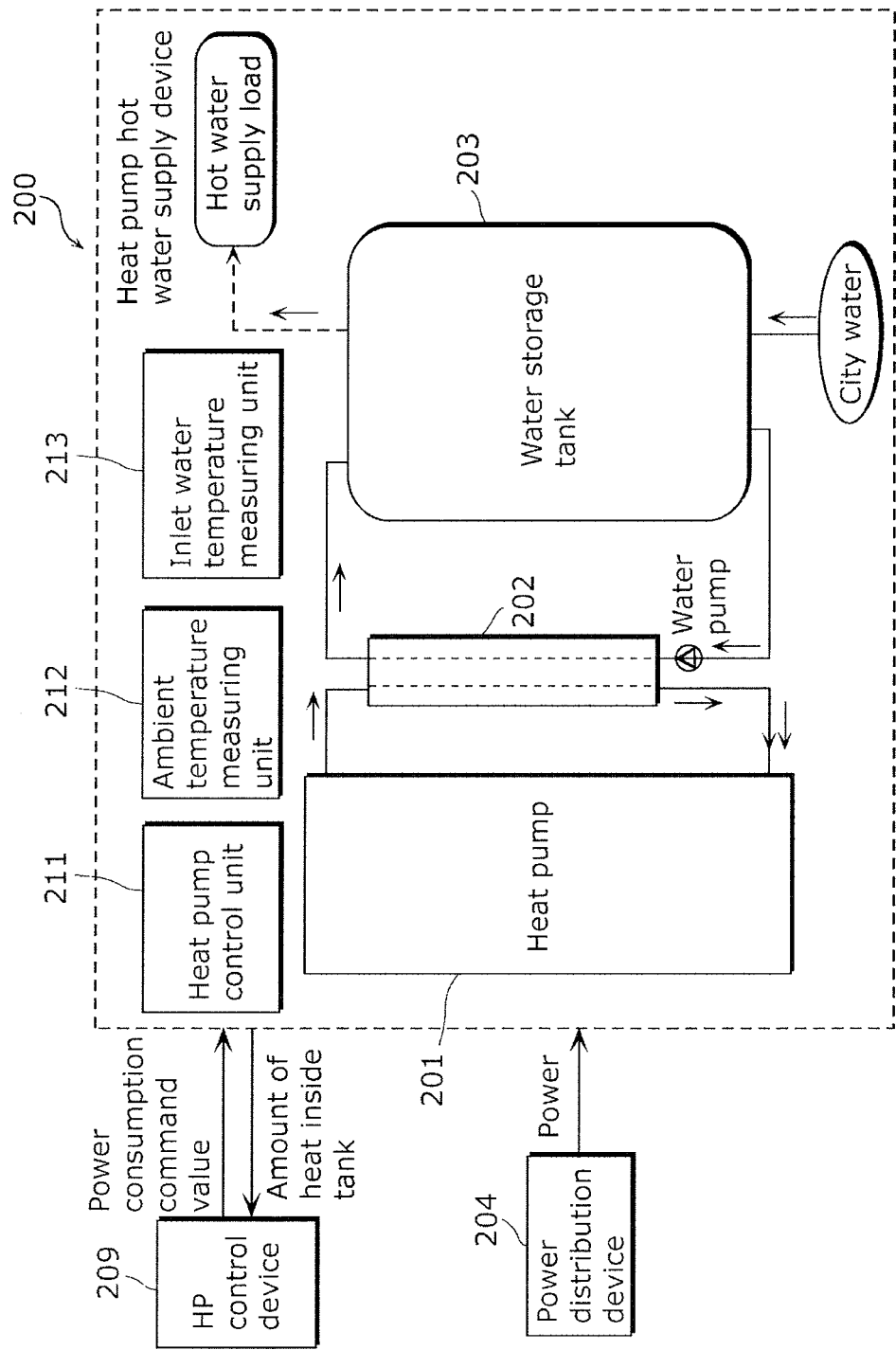
FIG. 3 is a diagram showing the configuration of the heat pump hot water supply device in detail.

FIG. 3 is a block diagram detailing the heat pump hot water supply device 200. The heat pump hot water supply device 200 is mainly configured from the heat pump 201, the heat exchanger 202, the water storage tank 203, the heat pump control unit 211, an ambient temperature measuring unit 212, and an inlet water temperature measuring unit 213. The heat pump hot water supply device 200 operates using power received from the power distribution device 204.

Although not included in the Drawings, the heat pump 201 includes an evaporator which facilitates heat exchange between outside air and low temperature-low pressure liquid refrigerant to generate a low temperature-low pressure vaporized refrigerant, a motor-driven compressor which compresses the low temperature-low pressure vaporized refrigerant into a high temperature-high pressure vaporized refrigerant, a condenser which facilitates heat exchange between the high temperature-high pressure vaporized refrigerant and circulating water (thermal storage medium) to generate a low temperature-high pressure liquid refrigerant, an expansion valve which reduces the pressure of the low temperature-high pressure vaporized refrigerant to generate a low temperature-low pressure liquid refrigerant, and a fan to accelerate the heat conversion between the refrigerant in the evaporator and the outside air, for example.

The water storage tank 203 stores heat supplied by the hot water supply load. The water storage tank 203 is consistently filled with water. When the heat pump 201 begins to operate, water flows from the bottom of the water storage tank 203 into the heat exchanger 202. The heat exchanger 202 facilitates heat exchange between hot water (thermal storage medium) supplied from the heat pump 201 and water supplied from the water storage tank 203. The heated hot water then flows into the top of the water storage tank 203. According to the first embodiment, the capacity of the water storage tank 203 is 400 L (unit: liters).

The heat pump control unit 211 controls the entire heat pump hot water supply device 200 based on the power consumption command value (explained later) obtained from the HP control device 209 and based on the state of the water storage tank 203. It is to be noted that the power consumption command value is a value calculated by the HP control device 209 which indicates a given amount of power for the heat pump to consume and operate at.

When the heat pump control unit 211 has not obtained the power consumption command value from the HP control device 209 (that is, is operating in a normal mode of operation), the operation method of the heat pump 201 is determined based on the current cost of electricity and the current state of the water storage tank 203. In other words, the heat pump heat pump 201 is caused to operate during the middle of the night when the electricity rate is low until the water storage tank 203 is full of hot water, and at all other times, when the amount of hot water stored in the water storage tank 203 decreases to a given amount, the heat pump 201 is caused to operate such that hot water does not run out. Moreover, a heated water temperature, which is a temperature of the water exiting the heat exchanger 202, is determined so that an amount of hot water supply load supplied in one day can be stored.

Under the normal mode of operation, the heat pump control unit 211 causes the heat pump 201 to operate at the rated power (1000 W, for example) so that a certain amount of heat can be supplied from the heat pump 201 to the water storage tank 203. As shown in FIG. 4, a first control table configured to supply a certain amount of heat according to the hardware characteristics of the heat pump 201 is stored in the heat pump control unit 211.

FIG. 4 shows an example of the first control table. When the inlet water temperature, ambient temperature, and heated water temperature are input as input information, the compressor frequency, expansion valve aperture, and pump flow rate of the water pump are output as output information. These pieces of output information are the control parameters for the heat pump 201 necessary to heat the water at the inlet water temperature to the heated water temperature in the ambient temperature environment.

When the heat pump control unit 211 causes the heat pump 201 to operate in the normal mode of operation, the temperature of the water flowing into the heat exchanger 202 from the water storage tank 203 (inlet water temperature) is obtained from the inlet water temperature measuring unit 213, and the ambient temperature surrounding the heat pump 201 is obtained from the ambient temperature measuring unit 212.

The ambient temperature measuring unit 212 is a thermistor which measures the ambient temperature surrounding the heat pump 201. The inlet water temperature measuring unit 213 is a thermistor which measures the temperature of the water flowing into the heat exchanger 202 from the water storage tank 203.

Next, the heat pump control unit 211 refers to the input information in the first table which includes the obtained inlet water temperature, the obtained ambient temperature, and the heated water temperature determined by the heat pump control unit 211 itself, performs linear interpolation based on a plurality of columns including values close to the value of the input information, then obtains the compressor frequency, expansion valve aperture, and pump flow rate of the water pump corresponding to the input information. The heat pump control unit 211 then causes the heat pump 201 to operate according to the obtained compressor frequency, expansion valve aperture, and pump flow rate of the water pump, thereby causing the generation of a certain amount of heat (causing the water at the inlet water temperature to be heated to the heated water temperature) by causing the heat pump 201 to consume its rated power.

On the other hand, when the heat pump control unit 211 obtains the power consumption command value from the HP control device 209 (that is, is operating in a surplus-oriented mode of operation), the operation of the heat pump 201 is controlled so that the heat pump load power matches the power consumption command value. As shown in FIG. 5, a second control table designed to supply a certain amount of heat pump load power according to the hardware characteristics of the heat pump 201 is stored in the heat pump control unit 211.

When the heat pump control unit 211 causes the heat pump 201 to operate in a surplus-oriented mode of operation, the inlet water temperature is obtained from the inlet water temperature measuring unit 213 and the ambient temperature is obtained from the ambient temperature measuring unit 212, similar to under the normal mode of operation. Next, the heat pump control unit 211 refers to the obtained inlet water temperature, ambient temperature, power consumption command value, and heated water temperature as input information in the second table, performs a linear interpolation operation based on a plurality of columns including values close to the value of the input information, then obtains the compressor frequency, expansion valve aperture, and pump flow rate of the water pump corresponding to the input information. The heat pump control unit 211 then causes the heat pump 201 to operate according to the obtained compressor frequency, expansion valve aperture, and pump flow rate of the water pump (shown in FIG. 3), thereby causing the generation of a certain amount of heat (that is, causing the water at the inlet water temperature to be heated to the heated water temperature) by causing the heat pump 201 to consume a given amount of power (the power consumption command value).

It is to be noted that other than the addition of the power consumption command value (unit: W) to the second control table shown in FIG. 5, the table is the same as the first control table shown in FIG. 4. Moreover, the power consumption command value in the example shown in FIG. 5 varies in 50 W increments, such as 500 W (lowest value), 550 W, and 600 W. The control parameters are configured to cause the heat pump 201 to consume an amount of power that is equivalent to this power consumption command value.

That is, with the first control table, the heat pump 201 will operate at its rated power regardless of which control parameter is selected, while with the second control table, the heat pump 201 can be caused to operate consuming a given amount of power (the power consumption command value) depending on the control parameter selected.

Figure 6:
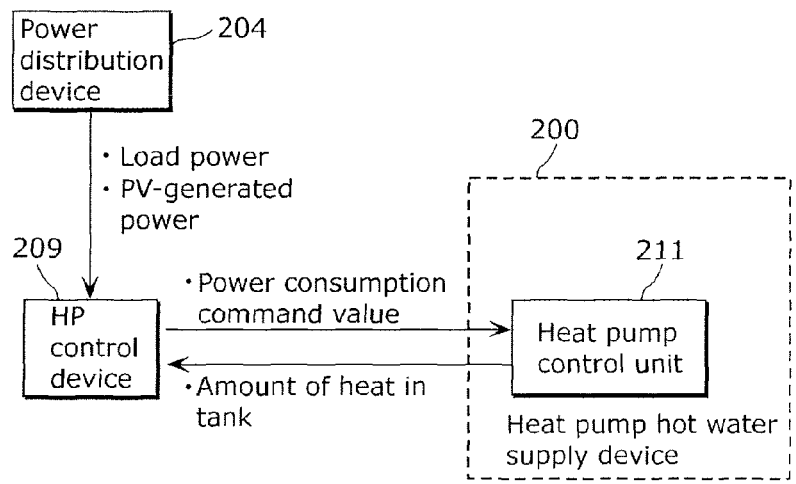
FIG. 6 is a diagram showing the flow of data with respect to the heat pump (HP) control device according to the first embodiment.

As the flow of data in FIG. 6 shows, the HP control device 209 calculates the power consumption command value, which is a given amount of power for the heat pump 201 to consume and operate at, taking into account the load power and PV-generated power obtained from the power distribution device 204, the surplus power which is the difference between the PV-generated power and the load power, and the amount of heat in the water storage tank obtained from the heat pump control unit 211.

Figure 7:
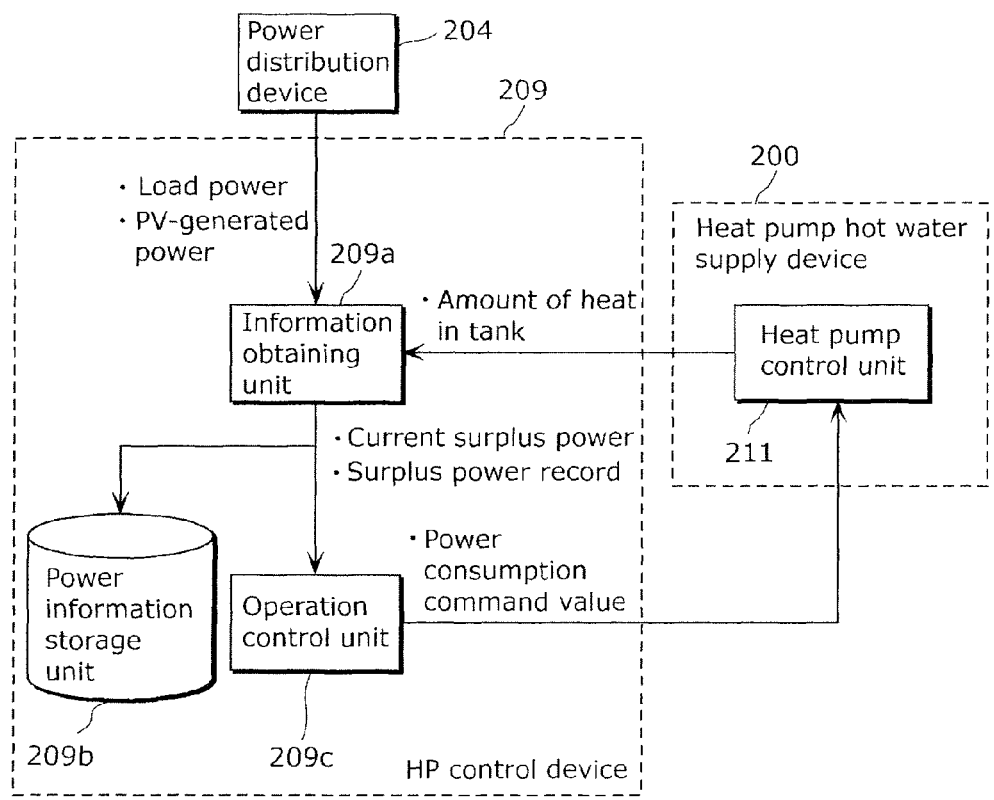
FIG. 7 is a block diagram showing the functions of the HP control device according to the first embodiment.

FIG. 7 is a block diagram detailing the HP control device 209. The HP control device 209 includes an information obtaining unit 209a, a power information storage unit 209b, and an operation control unit 209c.

On a per unit time basis (every minute, for example), the information obtaining unit 209a obtains the amount of heat stored in the water storage tank 203, the amount of power generated by the photovoltaic device 210 (the PV-generated power), the load power consumed by the first electric load 205, and the surplus power which is the difference between the PV-generated power and the load power. It is to be noted that the information obtaining unit 209a according to the first embodiment obtains the amount of heat stored in the water storage tank from the heat pump control unit 211, obtains the PV-generated power and the load power from the power distribution device 204, and calculates the surplus power internally.

The power information storage unit 209b stores information on the PV-generated power and the load power obtained by the information obtaining unit 209a each minute over the past 30 minutes, and information on the surplus power calculated by the information obtaining unit 209a each minute over the past 30 minutes (surplus power record). An example of each type of information stored can be seen in FIG. 8. It is to be noted that the surplus power is calculated by subtracting the load power from the PV-generated power. When the calculated value is negative, the value is output as zero, and when the calculated value is positive, the value is output as-is.

The surplus power record shown in FIG. 8 holds the load power (unit: W), the PV-generated power (unit: W), and the surplus power (unit: W) by the minute for the past 30 minutes. It is to be noted that the surplus power is calculated in 10 W increments by subtracting the load power from the PV-generated power. However, when the load power exceeds the PV-generated power, the surplus power is shown as 0, such as the example shown in the 9 minutes before row. In this case, the power distribution device 204 compensates the insufficient portion of the energy with the power purchased from the energy supplier 207.

Furthermore, FIG. 8 shows an example of the power consumption command value calculated by the operation control unit 209c at each time. The power consumption command value is set in 50 W increments, and the surplus power is rounded down to the nearest 50 W increment. For example, in the example shown in the 10 minutes before row, the surplus power (1010 W) is rounded down to make the power consumption command value 1000 W.

Moreover, the lowest value of the power consumption command value is 500 W. In other words, when the rounded off result is less than 500 W, the power consumption command value is 0 W, as is the case in the 1 minute before row. This is because even if the heat pump 201 were caused to operate at a low power consumption command value, the operation efficiency would be low.

Moreover, the power consumption command value is only calculated when the surplus power remains greater than a threshold value (the lowest consumption power: 500 W for example) for a given period of time (the minimum surplus time: 15 minutes for example). In other words, the surplus power in the 18 minute before row is above the threshold value, but in the 15 minutes up until that point in time, the surplus power decreased to or below the threshold value (not shown). For this reason, the power consumption command value in the 18 minutes before row is 0. The power consumption command value remains that value for one minute after it is determined. For example, the power consumption command value in the 12 minutes before row is 650 W. This value stays the same for one minute until the 11 minutes before time. When the time becomes 11 minutes before, the value is 850 W and remains so for one minute until the 10 minutes before time.

The power information storage unit 209b may be any means of storage capable of recording data, such as dynamic random access memory (DRAM), synchronous dynamic random access memory (SDRAM), flash memory, or ferrodielectric memory.

The operation control unit 209c controls the operation of the heat pump 201 so the power it consumes to generate heat increases and decreases in accordance with the increases and decreases in the surplus power on a unit time basis. Specifically, the operation control unit 209c calculates and sends the power consumption command value, which is a given amount of power for the heat pump 201 to consume and operate at, to the heat pump control unit 211 taking into account the surplus power record and the amount of heat in the water storage tank. Details regarding the calculation method of the power consumption command value will be described later.

When the surplus power record and the amount of heat in the water storage tank each meet a predetermined condition, the operation control unit 209c calculates and sends the power consumption command value to the heat pump control unit 211. Specifically, when (i) the surplus power remains greater than a predetermined threshold value (the lowest consumption power: 500 W) for a given period of time (the minimum surplus time: 15 minutes) extending back from the present time (first condition), (ii) the current amount of heat in the water storage tank is less than or equal to a predetermined upper limit (a sufficient amount of heat) (second condition), and (iii) the current amount of heat in the water storage tank is greater than a predetermined lower limit (an insufficient amount of heat) (third condition), the operation control unit 209c calculates and sends the power consumption command value to the heat pump control unit 211.

The lowest consumption power is the lowest amount of power at which the heat pump 201 can maintain or exceed a certain level of efficiency on account of the heat pump cycle of the heat pump 201 which depends on the refrigerant used. The minimum surplus time is a preset amount of time during which it can be assured that surplus power will be supplied stably. Moreover, a sufficient amount of heat refers to a maximum amount of heat that can be stored in the water storage tank 203 (for example 25000 kcal), while an insufficient amount of heat refers to a bare minimum amount of heat that should be stored in the water storage tank 203 to keep hot water from running out (for example 5000 kcal), similar to in the normal mode of operation as previously described. In other words, when the amount of heat inside the water storage tank 203 drops below the insufficient amount of heat, the heat pump 201 starts the normal mode of operation instead of the surplus-oriented mode of operation.

That is, when (i) the heat pump 201 can remain at or above a certain level of efficiency and operate continuously until the level of efficiency stabilizes after starting to operate while only consuming surplus power (first condition), (ii) the heat pump 201 can still store heat in the water storage tank 203 (second condition), and (iii) the amount of heat in the water storage tank 203 is sufficient enough that hot water will not run out (third condition), the operation control unit 209c calculates and sends the power consumption command value to the heat pump control unit 211.

The power consumption command value is sent only when these three conditions are met, that is to say, when the heat generation efficiency of the heat pump 201 can be maintained, heat can additionally be stored in the water storage tank 203, and the water storage tank 203 will not run out of hot water. When sent, the heat pump 201 is caused to operate by consuming power in accordance with the surplus power, as previously described.

Hereinafter, an exemplary operation of the heat pump hot water supply system 2000 according to the first embodiment is described. The description will be given on the premise that the present time is 12:00:00, and the heat pump hot water supply system 2000 has been continuously operating for 30 minutes or more. Moreover, the heated water temperature of the heat pump 201 is 70 degrees Celsius, as determined by the heat pump control unit 211.

Figure 9:
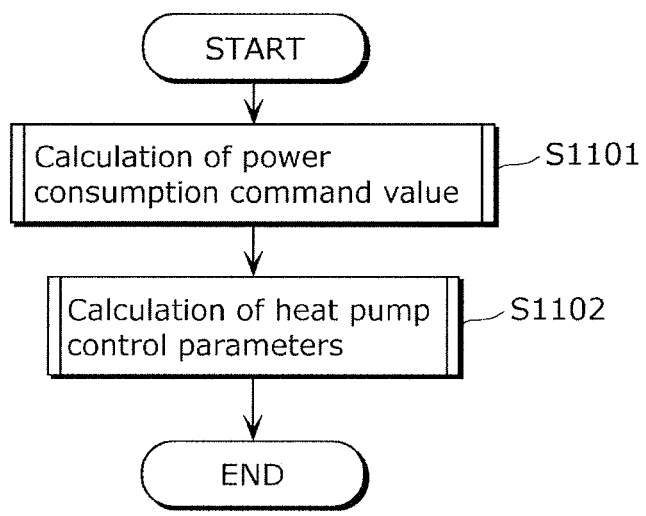
FIG. 9 is a flowchart of operation processes performed by the HP control device and a heat pump control unit.

FIG. 9 is a flowchart of operation processes performed on a per minute basis by the HP control device 209 and the heat pump control unit 211.

Figure 10:
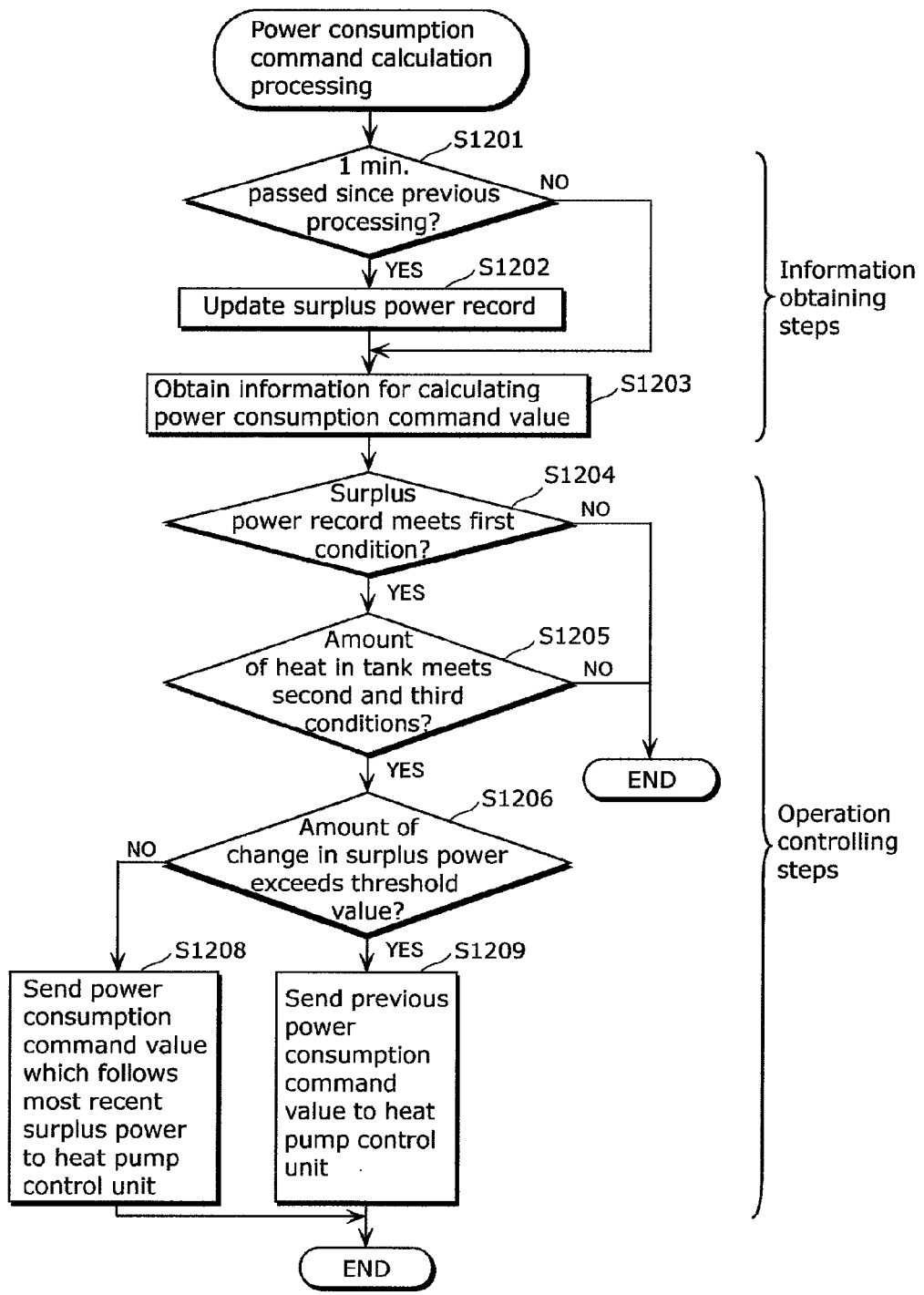
FIG. 10 is a flowchart of processes performed by the HP control device related to the calculation of a power consumption command value.

First, the HP control device 209 calculates the power consumption command value (S1101). FIG. 10 is a flowchart of processes performed by the HP control device 209 related to the calculation of the power consumption command value (S1101).

First, the information obtaining unit 209a compares the previous processing time with the current processing time, and determines whether one minute has passed since the previous processing time (S1201). As previously described, since the present time is 12:00:00, it is determined that the minute value has changed since the previous processing time (yes in S1201).

When yes in S1201, the information obtaining unit 209a updates the surplus power record stored in the power information storage unit 209b (S1202). The information obtaining unit 209a obtains the average load power over the past minute and the average PV-generated power over the past minute from the power distribution device 204. Moreover, the information obtaining unit 209a subtracts the load power from the PV-generated power. The information obtaining unit 209a sets the surplus power to zero if the value is negative, and sets the surplus power to the calculated value if the value is positive. The information obtaining unit 209a then discards the value from 30 minutes ago (the oldest value) from the surplus power record stored in the power information storage unit 209b, and stores the most recent PV-generated power, load power, and surplus power as values for the previous minute.

On the other hand, when it is determined that the minute value has not changed since the previous processing time (no in S1201), the surplus power record is not updated.

Next, the information obtaining unit 209a obtains other information used in the calculation of the power consumption command value (S1203). Specifically, the information obtaining unit 209a obtains the surplus power record and the last obtained surplus power from the power information storage unit 209b, and obtains the amount of heat in the water storage tank from the heat pump control unit 211. The information obtaining unit 209a then transmits the obtained information to the operation control unit 209c.

The operation control unit 209c determines whether or not the surplus power record meets the first condition (S1204). The first condition according to the first embodiment is that the surplus power remains greater than the lowest consumption power for the minimum surplus time or longer. Moreover, according to the first embodiment, the lowest consumption power is 500 W and the minimum surplus time is 15 minutes. For example, when the surplus power values between 1 minute before and 15 minutes before in the current surplus power record all exceed 500 W, it is determined that the surplus power record meets the first condition (yes in S1204).

Next, the operation control unit 209c determines whether or not the amount of heat in the water storage tank meets the second and third conditions (S1205). The second condition according to the first embodiment is that the previous amount of heat in the water storage tank is less than or equal to the sufficient amount of heat. The third condition according to the first embodiment is that the previous amount of heat in the water storage tank exceeds the insufficient amount of heat. Moreover, according to the first embodiment, the sufficient amount of heat is 25,000 kcal, and the insufficient amount of heat is 5,000 kcal. If the previous amount of heat in the water storage tank is 10,000 kcal, for example, it is determined that the amount of heat in the water storage tank meets the second and third conditions (yes in S1205).

On the other hand, when the surplus power record does not meet the first condition (no in S1204), or when the amount of heat in the water storage tank does not meet the second and third conditions (no in S1205), the operation control unit 209c ends the processing without calculating the power consumption command value.

When the first through third conditions are met (yes in S1205), the operation control unit 209c determines whether the amount of change in surplus power obtained over a given period of time extending back from the present time is greater than a predetermined threshold value (S1206).

It is to be noted that, the "given period of time" in S1206 is much shorter than the "minimum surplus time" according to the first condition. The given period of time is, for example, approximately from 30 seconds to two minutes. Moreover, the "threshold value" in S1206 is a value determined in advance based on a per unit time amount of change in power that the heat pump 201 is capable of following. The threshold value is, for example, approximately from 500 W to 1500 W. Moreover, the "given period of time" and the "threshold value" described above are correlated, and in general, the smaller the "given period of time" is, the smaller the "threshold value" is. For example, the threshold value for a given time period of one minute can be set to 1000 W. Furthermore, the "given period of time" and the "threshold value" are not limited to fixed values, but may be updated based on previous shifts in surplus power, for example.

When the amount of change in surplus power obtained over a given period of time is not greater than a predetermined threshold value (no in S1206), the operation control unit 209c calculates the power consumption command value based on the surplus power, and transmits the power consumption command value to the heat pump control unit 211 (S1208). Specifically, the operation control unit 209c sets the power consumption command value to the previous (most recent) surplus power. Here, the previous surplus power is the surplus power (W) numerical value shown in the one minute before row in FIG. 8. In other words, the previous surplus power is the most recent surplus power shown in the table in FIG. 8. The power consumption command value based on this previous (most recent) surplus power value remains that value for one minute.

Moreover, it is not necessary to make the power consumption command value the exact surplus power, as-is. The power consumption command value may be made a value that is slightly lower than the surplus power. For example, if the previous surplus power is 650 W, the power consumption command value may be made 630 W. However, it is not suitable for the power consumption command value to be set to a value that is larger than the surplus power.

Conversely, when the amount of change in surplus power obtained over a given period of time is greater than a predetermined threshold value (yes in S1206), the operation control unit 209c does not make the previously obtained surplus power the power consumption command value, but rather transmits the last calculated power consumption command value to the heat pump control unit 211 (S1209). In other words, in this case, the power consumption command value temporarily stops the amount of power consumed by the heat pump 201 from following the increases and decreases in surplus power (that is, reduces the extent to which the power consumed by the heat pump follows the surplus power). Next, calculation of the last calculated power consumption command value will be discussed in further detail. Suppose that up until the two minutes before row, the amount of fluctuation in the surplus power is within the threshold, but exceeds the threshold value at the one minute before row. In this case, the power consumption command value from the two minutes before row, which up until this point has been within the threshold, is continued to be used as the power consumption command value instead of the surplus power in the one minute before row. In other words, in order to keep the power consumption command value from following the surplus power, a previously obtained power consumption command value from when the amount of fluctuation is within the threshold is adopted as to be the power consumption command value, not the most recent surplus power.

Next, returning to FIG. 9, the heat pump control unit 211 performs the processes related to the calculation of the control parameters for the heat pump 201 using the power consumption command value obtained from the HP control device 209 (S1102). FIG. 11 is a flowchart of the processes related to the calculation of the control parameters for the heat pump 201 (S1102) performed by the heat pump control unit 211.

First, the heat pump control unit 211 determines whether a new power consumption command value has been obtained from the HP control device 209 (S1301).

When "yes" in S1301, the heat pump control unit 211 obtains input information needed to calculate the control parameters (S1302). The heat pump control unit 211 obtains, from the inlet water temperature measuring unit 213, the inlet water temperature of the water supplied to the heat exchanger 202 from the water storage tank 203, and obtains the ambient temperature surrounding the heat pump 201 from the ambient temperature measuring unit 212. It is to be noted that the heated water temperature is held in the heat pump control unit 211 in advance, and the power consumption command value has already been obtained from the HP control device 209.

Next, the heat pump control unit 211 refers to the second control table and obtains output information corresponding to the inlet water temperature, ambient temperature, heated water temperature, and power consumption command value obtained as input information (S1303). An example of the input information is shown in FIG. 12A, and an example of the second control table is shown in FIG. 12B. In this example, as the input information, the power consumption command value obtained is 1000 W, the inlet water temperature obtained is 13 decrees Celsius, the ambient temperature obtained is 11 degrees Celsius, and the heated water temperature obtained is 70 degrees Celsius. Upon referring to the second control table, the power consumption command value and the heated water temperature are consistent throughout the input information, but the inlet water temperature and the ambient temperature are not.

The values set in the second control table are discrete values. Therefore, when there is no set of values in the second control table that do not exactly match the combination of the input information, the heat pump control unit 211 calculates the control parameters using linear interpolation (S1304). The heat pump control unit 211 uses input information and output information between columns in the second control table to obtain, by linear interpolation, output information which corresponds to the input information.

FIG. 13A and FIG. 13B show an example of a result of the linear interpolation using the input information shown in FIG. 12A and the second control table shown in FIG. 12B.

In the following example, a linear interpolation is applied with respect to the ambient temperature as the first linear interpolation. The results shown in FIG. 13A are calculated by applying a linear interpolation to the output information between the columns in which only the ambient temperatures in the second control table shown in FIG. 12B are different using the ambient temperature (11 degrees Celsius). In other words, the first column in FIG. 13A is the result of the linear interpolation of the first and second columns in FIG. 12B, and the second column in FIG. 13A is the result of the linear interpolation of the third and fourth columns in FIG. 12B.

Furthermore, a linear interpolation is applied a second time with respect to the inlet water temperature using the result of the first linear interpolation shown in FIG. 13A. The results shown in FIG. 13B are calculated by applying a linear interpolation to the output information between the columns in which only the inlet water temperatures in FIG. 13A are different using the inlet water temperature (13 degrees Celsius). As a result, output information which corresponds to the input information shown in FIG. 12A is obtained. In other words, when the operation of the heat pump 201 is controlled using the calculated output information (S1309), the heat pump 201 consumes an amount of power that is close to the power consumption command value.

On the other hand, when a new power consumption command value is not obtained (no in S1301), the heat pump control unit 211 determines whether to cause the heat pump 201 to operate in the normal mode of operation (S1305). In other words, the heat pump control unit 211, as previously described, determines whether to cause the heat pump 201 to operate in the normal mode of operation while taking into consideration the current cost of electricity and the current amount of stored hot water in the water storage tank 203. Specifically, under the normal mode of operation, the heat pump heat pump 201 is caused to operate during the middle of the night when the electricity rate is low until the water storage tank 203 is full of hot water, and at all other times, when the amount of hot water stored in the water storage tank 203 decreases to a given amount, the heat pump 201 is caused to operate such that hot water does not run out.

When "yes" in S1305, the heat pump control unit 211 obtains input information necessary for calculating the control parameters (S1306), refers to the first control table (S1307), and applies a linear interpolation when necessary (S1308), whereby the control parameters are calculated. It is to be noted that the processes in S1306 to S1308 are the same as S1302 to S1304 except for the fact that the power consumption command value is not included in the input information and that the first control table is being used. As such, explanation thereof will be omitted.

When the operation of the heat pump 201 is controlled using the calculated output information (S1309), the rated power is consumed by the heat pump 201 and a certain amount of heat is supplied.

However, when "no" in S1305, the heat pump control unit 211 ends the processing without calculating the control parameters for the heat pump 201 due to non-operation of the heat pump 201.

The heat pump control unit 211 controls the operation of the heat pump 201 using the control parameters calculated in the above processes. The power consumed by the heat pump 201 operating according to the control parameters calculated in especially S1302 to S1304 is a value that is the same as or close to the power consumption command value calculated by the HP control device 209. Since the power consumption command value is updated on a per time unit basis, the power consumed by the heat pump 201 (the heat pump load power) increases and decreases with the power consumption command values on a per time unit basis.

However, when the variation in power consumption command values is large and the heat pump load power cannot keep up with the variations in the power consumption command values, there are cases in which the heat pump load power and the power consumption command value momentarily deviate from each other. That is, the heat pump control unit 211 controls the operation of the heat pump 201 to bring the heat pump load power closer to the previously obtained power consumption command value (surplus power).

Here, the relationship between the change in surplus power and the calculated power consumption command value will be explained with reference to FIG. 14.

First, when the amount of change in surplus power is less than or equal to the threshold value (no in S1206 shown in FIG. 10), the power consumption command value calculated in S1208 in FIG. 10 is a value that is the same as or very close to the previous surplus power. In other words, in FIG. 14, the power consumption command values in the time periods having a white background are made to closely follow the increases and decreases in the surplus power (the extent to which the power consumed follows the surplus power is high). As a result, the majority of the surplus power is consumed by the heat pump 201, and the amount of power sent in reverse through the power grid is greatly reduced.

On the other hand, when the amount of change in surplus power is greater than the threshold value (yes in S1206 shown in FIG. 10), the power consumption command value calculated in S1209 in FIG. 10 is not the last calculated power consumption command value, but is a value equal to a power consumption command value calculated previous to the last calculated power consumption command value. In other words, in FIG. 14, the power consumption command values in the time periods having a shaded background are values which temporarily deviate from the surplus power, reducing the extent to which the power consumed follows the surplus power. As a result, reverse power is generated when the surplus power exceeds the power consumption command value, and power is purchased when the power consumption command value exceeds the surplus power.

Here, an abrupt change in surplus power occurs when, for example, operation of a hair dryer, microwave oven, or some other first electric load 205 is started or stopped. This abrupt change in surplus power, as is shown in FIG. 14, tends to peak and return to its original value in a relatively short span of time. In other words, a rapid increase and a rapid decrease in surplus power tend to occur as a set within a short period of time.

The amount of change in consumption power that the heat pump 201 is generally capable of following is, at most, approximately 200 W to 300 W per minute. In other words, when the amount of change between power consumption command values exceeds this amount, the heat pump 201 cannot actually consume an amount of power which keeps up with the power consumption command value, leading to a temporary deviation in the heat pump load power and the power consumption command value.

More specifically, even if a power consumption command value was calculated to follow the abrupt increase in surplus power shown in the period (1) in FIG. 14, a lag would occur as the heat pump load power could not follow such a power consumption command value. Consequently, the reverse flow of power would occur. Next, after the abrupt increase in surplus power shortly comes to an end, the heat pump load power would be in the process of gradually rising at the time the rapid decrease in surplus power shown in the period (2) in FIG. 14 begins. Even if the power consumption command value were made to follow this rapid decrease, the heat pump load power would not be able to keep up. Consequently, the purchase of power would occur.

In this way, even if the heat pump load power is forcedly made to follow the abrupt changes in surplus power, in the end, the heat pump load power will not be able to keep up, resulting in the reverse flow of power as well as the purchase of power. For this reason, the HP control device 209 temporarily makes the power consumption command value stop following the surplus power during a period of abrupt change in surplus power. In other words, a substantially constant power consumption command value is maintained by adopting a value equal to a power consumption command value previous to the most recent power consumption command value instead of the most recent surplus power. With the present invention, abrupt fluctuations in heat pump load power can be prevented in exchange for permitting a small amount of power to flow in reverse or the purchase of power, resulting in stable operation of the heat pump 201.

Hereinafter, an advantage of the heat pump hot water supply system 2000 including the power generation device according to the first embodiment of the present invention is described.

The heat pump control unit 211 stores the first control table used in the normal mode of operation, and the second control table used when the heat pump load power is caused to follow the power consumption command value (surplus power). The second control table is generated based on actual tests conducted beforehand to make the heat pump load power come close to the power consumption command value and is stored in the heat pump control unit 211. As a result, the heat pump load power follows the variation in the power consumption command value as previously described, and a cost-effective mode of operation can be achieved.

With the present invention, a small amount of reverse flow or purchase of power is permitted in exchange for the prevention of abrupt fluctuation in heat pump load power, which is achieved by temporarily stopping the power consumption command values from following the surplus power in a period of rapid change in surplus power, resulting in stable operation of the heat pump 201.

Moreover, satisfaction of the condition (the first condition) in which the surplus power remains greater than the lowest consumption power for the minimum surplus time or longer counting back from the present time, is one condition for the output of the power consumption command value by the HP control device 209. It is preferable that the lowest consumption power be set to the lowest amount of power at which the heat pump 201 can maintain a given level of efficiency or above on account of the heat pump cycle of the heat pump 201 which depends on the refrigerant used. With this, the worsening of the cycle characteristic and the low efficiency operation of the heat pump 201 due to an extremely low power consumption command value being calculated ceases.

Moreover, satisfaction of the first condition means that the surplus power has been generating stably for a given period of time (minimum surplus time) counting back from the present time, as well as that it is highly likely that a given amount of surplus power or more is generated. There is a problem with the heat pump 201 in that some time is required for the heat pump to reach rated operation after being turned on, and during that time, the operation efficiency of the heat pump 201 is low. In other words, when the supply of surplus power is unstable, the heat pump 201 stops operating shortly after being turned on, resulting in low-efficient operation. For that reason, it is preferable that the minimum surplus time in the first condition be set to an amount of time required for the heat pump 201 to reach rated operation after being turned on. Consequently, the heat pump 201 will cease to operate at a low level of efficiency.

With the configuration described in the first embodiment, the heat pump hot water supply system 2000 including the photovoltaic device 210 can achieve a decrease in the amount of reverse power transmitted to the power grid as well as a cost-effective mode of operation.

Hereinbefore the heat pump hot water supply system 2000 according to the first embodiment was described, but the following embodiment is also acceptable.

The photovoltaic device 210 was described as an example of a power generation device, but other power generation devices such as those which use wind power or fuel cells may be used.

Moreover, the HP control device 209 including the function of the gateway is located external to the heat pump hot water supply device 200, but may be located internally in the heat pump hot water supply device 200 or internally in the power distribution device 204. Moreover, the operation control function of the HP control device 209 may be provided in the heat pump hot water supply device 200 or the power distribution device 204.

Moreover, the HP control device 209 and the heat pump control unit 211 implement the operation control on a per minute basis, but may also be implemented on a per one-hundredth of a second or on a per second basis.

Furthermore, in FIG. 10, it is shown that the processing proceeds to S1206 only when the first through third conditions are met, but the processing is not limited thereto. In other words, the determination of whether to calculate the power consumption command value can be made with a different condition while omitting a part of the first through third embodiments. For example, in the heat pump hot water supply device 200 installed in a home, when the amount of heat inside the water storage tank 203 is regularly within range with respect to the sufficient amount of heat and the insufficient amount of heat, the processing load of the operation control unit 209c can be reduced by omitting the processes of determining the second and third conditions. In this case, in FIG. 10, the processing would flow from yes in S1204 to S1206, skipping over S1205.

Second Embodiment

Figure 16:
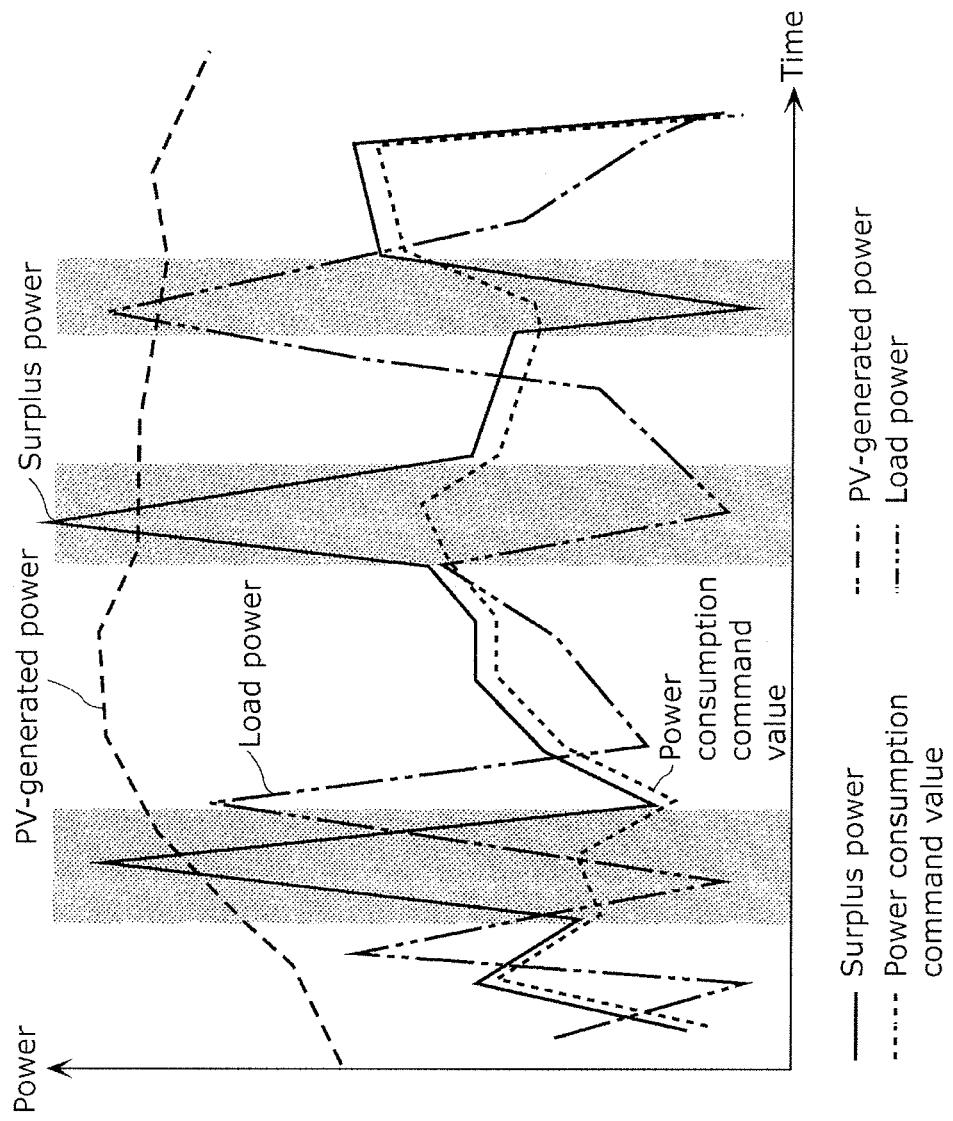
FIG. 16 is a graph illustrating a situation when "yes" is determined in S1207 in FIG. 15.

Next, operation of the heat pump hot water supply system according to the second embodiment of the present invention will be explained with reference to FIG. 15 through FIG. 17. The explanation will therefore focus on the points inherent in the second embodiment, and details regarding common points with the first embodiment will be omitted.

FIG. 15 is a flow chart showing a different embodiment of that of FIG. 10. The flow chart shown in FIG. 15 is the same as the flow chart shown in FIG. 10 with the exception that S1207 is added after S1206. In other words, when the amount of change in surplus power obtained over a given period of time is greater than a predetermined threshold value (yes in S1206), the operation control unit 209c according to the second embodiment compares the amount of change in load power in a given period of time extending back from the present time with the amount of change in PV-generated power in a period corresponding to the given period (S1207).

When the amount of change in load power is greater than the amount of change in PV-generated power (yes in S1207), the operation control unit 209c does not make the most recent surplus power the power consumption command value, but rather transmits the previous power consumption command value to the heat pump control unit 211 (S1209). Conversely, when the amount of change in load power is less than or equal to the amount of change in PV-generated power (no in S1207), the operation control unit 209c a power consumption command value which follows the most recent surplus power to the heat pump control unit 211 (S1208).

Next, an advantage of the second embodiment is described with reference to FIG. 16 and FIG. 17. FIG. 16 and FIG. 17 show the relationship between the surplus power, the power consumption command values, the PV-generated power, and the load power. FIG. 16 is a graph for illustrating the result when S1207 is determined as "yes" in FIG. 15, and FIG. 17 is a graph for illustrating the result when S1207 is determined as "no" in FIG. 15.

Firstly, the surplus power is a difference between the PV-generated power and the load power. This means that an abrupt fluctuation in surplus power is a result of a rapid fluctuation in PV-generated power or load power More specifically, an abrupt fluctuation in surplus power results from situations in which, for example, the PV-generated power stays substantially constant and only the load power abruptly fluctuates, the load power stays substantially constant and only the PV-generated power abruptly fluctuates, or the PV-generated power and the load power abruptly fluctuate in mutually different directions.

Here, the main cause for the fluctuation in load power is the starting and stopping of operation of the first electric load 205. For this reason, fluctuation in load power is generally abrupt and ends rapidly, as can be seen in FIG. 16. Thus, even if the power consumption command value is made to follow to the fluctuations in surplus power when the amount of change in load power is relatively large (yes in S1207 in FIG. 15), the heat pump load power cannot keep up, similar to as is explained in the first embodiment. In this situation, instead of a power consumption command value calculated based on the most recent surplus power value, it is preferable that a previous power consumption command value be transmitted to the heat pump control unit 211 (it is preferred that the power consumption command value does not follow the surplus power) (S1209 in FIG. 15).

On the other hand, the main cause for the fluctuation in PV-generated power is changes in weather or changes in sunrise and sundown times, for example. For this reason, it is likely that a fluctuation in the PV-generated power will continue for a relatively long period of time. Thus, compared to load power, fluctuation in PV-generated power is generally gradual and long lasting, as can be seen in FIG. 17. In this situation, it is preferable that a power consumption command value calculated based on the most recent surplus power value be transmitted to the heat pump control unit 211 (it is preferred that the power consumption command value follow the surplus power).

With this, by also taking into consideration the cause of the fluctuations in surplus power when controlling the extent to which the power consumption command value follows the surplus power, both the efficient consumption of surplus power while inhibiting the purchase of power and the stable operation of the heat pump 201 can be achieved.

In the second embodiment as well, it is shown in FIG. 15 that the processing proceeds to S1206 only when the first through third conditions are met, but the processing is not limited thereto. In other words, the determination of whether to calculate the power consumption command value can be made with a different condition while omitting a part of the first through third conditions. For example, in the heat pump hot water supply device 200 installed in a home, when the amount of heat inside the water storage tank 203 is regularly within range with respect to the sufficient amount of heat and the insufficient amount of heat, the processing load of the operation control unit 209c can be reduced by omitting the processes of determining the second and third conditions. In this case, in FIG. 15, the processing would flow from yes in S1204 to S1206, skipping over S1205.

It should be noted that although the present invention was described based on the previous embodiments, the present invention is not limited to these embodiments. The following examples are also intended to be included within the scope of the present invention.

Each of the preceding devices is, specifically, a computer system configured from a microprocessor, ROM, RAM, a hard disk unit, a display unit, a keyboard, and a mouse, for example. A computer program is stored in the RAM or the hard disk unit. Each of the devices achieves its function as a result of the microprocessor operating according to the computer program. Here, the computer program is configured of a plurality of pieced together instruction codes indicating a command to the computer in order to achieve a given function.

A portion or all of the components of each of the preceding devices may be configured from one system LSI (Large Scale Integration). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

A portion or all of the components of each of the preceding devices may each be configured from a detachable IC card or a stand-alone module. The IC card and the module are computer systems configured from a microprocessor, ROM, and RAM, for example. The IC card and the module may include the super-multifunction LSI described above. The IC card and the module achieve their function as a result of the microprocessor operating according to a computer program. The IC card and the module may be tamperproof.

The present invention may be a method shown above. Moreover, the present invention may also be a computer program realizing these methods with a computer, or a digital signal of the computer program.

Moreover, the present invention may also be realized as the computer program or the digital signal stored on storage media readable by a computer, such as a flexible disk, hard disk, CD-ROM, MO, DVD, DVD-ROM, DVD-RAM, DVD-RAM, BD (Blu-ray Disc), or a semiconductor memory. The present invention may also be the digital signal stored on the above mentioned storage media.

Moreover, the present invention may also be realized by transmitting the computer program or the digital signal, for example, via an electric communication line, a wireless or wired line, a network such as the Internet, or data broadcasting.

Moreover, the present invention may be a computer system including memory storing the computer program and a microprocessor operating according to the computer program.

Moreover, the computer program or the digital signal may be implemented by an independent computer system by being stored on the storage media and transmitted, or sent via the network, for example.

The preceding embodiments and the preceding transformation examples may be individually combined.

Hereinbefore, the embodiments of the present invention were described with reference to the drawings, but the present invention is not limited to the embodiments depicted in the drawings. It is acceptable to add variations to or modify the embodiments depicted in the drawings within the scope of the invention or an equal scope.

INDUSTRIAL APPLICABILITY

The HP control device according to the present invention is useful as a device which contributes to the reduction of energy costs and to the stabilization of the power grid when a hot water supply system or a hot water supply and heating system, for example, is in operation.

REFERENCE SIGNS LIST

200 heat pump hot water supply device
201 heat pump
202 heat exchanger
203 water storage tank
204, 304 power distribution device
205 first electric load
206 power meter
207 energy supplier
209, 309 HP control device
209a, 309a information obtaining unit
209b, 309b power information storage unit
209c, 309c operation control unit
210 photovoltaic device
211 heat pump control unit
212 ambient temperature measuring unit
213 inlet water temperature measuring unit
2000, 3000 heat pump hot water supply system

The invention claimed is:

1. A heat pump operation method for use in a system which includes a power generation device, an electric load which operates using power generated by the power generation device, and a heat pump which generates heat using the power generated by the power generation device, the method comprising:

obtaining, at predetermined time intervals, generated power, which is an amount of the power generated by the power generation device, load power, which is an amount of power consumed by the electric load, and surplus power, which is a difference between the generated power and the load power; and controlling, at the predetermined time intervals, an operation of the heat pump to cause the heat pump to generate heat using power determined based on the surplus power, wherein, in the controlling, when the surplus power remains greater than or equal to a predetermined amount of power for a first period of time or longer, which is a given prior period of time, measured from a present time, and an amount of change in the surplus power in a second period of time, which is a given prior period of time, measured from the present time, and shorter than the first period of time, is equal to or smaller than a predetermined threshold value, the operation of the heat pump is controlled to generate heat using power that follows an increase or decrease in the surplus power, and when the surplus power remains greater than or equal to the predetermined amount of power for the first period of time or longer, and the amount of change in the surplus power in the second period of time is greater than the predetermined threshold value, the operation of the heat pump is controlled to generate heat using power that does not follow the increase or decrease in the surplus power.

2. The heat pump operation method according to claim 1, wherein, in the controlling, the operation of the heat pump is controlled to generate heat using power that does not follow the increase or decrease in the surplus power, when the amount of change in the surplus power in the second period of time is greater than the predetermined threshold value, and an amount of change in the load power is greater than an amount of change in the generated power.

3. The heat pump operation method according to claim 1, wherein, in the controlling, the operation of the heat pump is controlled to generate heat using the power approximately corresponding to the surplus power last obtained.

4. The heat pump operation method according to claim 1, wherein, in the controlling, the operation of the heat pump is controlled to cause the heat pump to consume an amount of power adjusted to follow the surplus power obtained, when a first condition is met, the first condition being that the surplus power remains greater than the predetermined amount of power for the first period of time.

5. The heat pump operation method according to claim 4, wherein, in the obtaining, an amount of heat in a water storage tank which stores hot water heated by the heat generated by the heat pump is obtained at the predetermined time intervals, and in the controlling, the operation of the heat pump is controlled to cause the heat pump to consume the amount of power adjusted to follow the surplus power obtained at the predetermined time intervals, when a second condition is met, in addition to the first condition, the second condition being that the amount of heat in the water storage tank last obtained is less than or equal to a predetermined upper limit.

6. The heat pump operation method according to claim 5, wherein, in the controlling, the operation of the heat pump is controlled to cause the heat pump to consume the amount of power adjusted to follow the surplus power obtained at the predetermined time intervals, when a third condition is met, in addition to the first condition and the second condition, the third condition being that the amount of heat in the water storage tank last obtained is greater than a predetermined lower limit.

7. The heat pump operation method according to claim 1, wherein the system includes the heat pump which generates heat, a water storage tank which stores hot water, and a heat exchanger which heats the hot water stored in the water storage tank with the heat generated by the heat pump, and in the controlling:

an ambient temperature, which is a temperature surrounding the heat pump, an inlet water temperature, which is a temperature of the hot water flowing through the heat exchanger from the water storage tank, and a heated water temperature, which is a temperature of the hot water supplied to the water storage tank from the heat exchanger are obtained;

control parameters are obtained, the control parameters (i) causing the heat pump to consume an amount of power adjusted to follow the surplus power obtained at the predetermined time intervals, and (ii) causing the heat pump to increase the temperature of the hot water from the inlet water temperature to the heated water temperature; and the operation of the heat pump is controlled according to the obtained control parameters.

8. The heat pump operation method according to claim 7, wherein in the controlling, the control parameters corresponding to input information including the amount of power consumed by the heat pump, the ambient temperature, the inlet water temperature, and the heated water temperature, are obtained by referring to a control table holding the input information and the control parameters corresponding to a combination of the input information.

9. The heat pump operation method according to claim 8, wherein discrete values of the input information are held in the control table, and in the controlling, when the combination of the obtained input information is not held in the control table, the control parameters corresponding to the combination of the obtained input information are obtained by linear interpolation based on a plurality of the control parameters held in the control table.

10. The heat pump operation method according to claim 6, wherein in the controlling, when at least one of the first condition, the second condition, and the third condition is not met, the operation of the heat pump is controlled to cause the heat pump to consume an amount of power comparable to a rated power of the heat pump.

11. A heat pump operation method for use in a system which includes a power generation device, an electric load which operates using power generated by the power generation device, and a heat pump which generates heat using the power generated by the power generation device, the method comprising:

obtaining generated power, which is an amount of the power generated by the power generation device, load power, which is an amount of power consumed by the electric load, and surplus power, which is a difference between the generated power and the load power; and controlling an operation of the heat pump by transmitting a power consumption command value to the heat pump at predetermined time intervals, the power consumption command value being an amount of power to be consumed by the heat pump for generating heat, wherein in the controlling, when the surplus power remains greater than or equal to a first threshold value for a first period of time or longer, which is a given prior period of time, measured from a present time, the power consumption command value at the present time is calculated to follow the surplus power, when an amount of change in the surplus power in a second period of time, which is a given prior period of time, measured from the present time, and shorter than the first period of time, is greater than a second threshold value, the power consumption command value previously calculated before the second period of time is transmitted to the heat pump, such that the operation of the heat pump is controlled to generate heat using power that does not follow the increase or decrease in the surplus power, and when the amount of change in the surplus power in the second period of time is less than or equal to the second threshold value, the power consumption command value calculated at the present time is transmitted to the heat pump, such that the operation of the heat pump is controlled to generate heat using power that follows the increase or decrease in the surplus power.

12. The heat pump operation method according to claim 11,
wherein when the power consumption command value is not obtained, control parameters are calculated using a first control table, and
when the power consumption command value is obtained, control parameters are calculated using a second control table which holds the power consumption command value.

13. A heat pump system which includes a power generation device, an electric load which operates using power generated by the power generation device, and a heat pump which generates heat using the power generated by the power generation device, the heat pump system comprising:
an information obtainer configured to obtain, at predetermined time intervals, generated power, which is an amount of the power generated by the power generation device, load power, which is an amount of power consumed by the electric load, and surplus power, which is a difference between the generated power and the load power; and
an operation controller configured to cause, at the predetermined time intervals, the heat pump to generate heat using power determined based on the surplus power,
wherein the operation controller is further configured to,
when the surplus power remains greater than or equal to a predetermined amount of power for a first period of time or longer, which is a given prior period of time, measured from a present time, and an amount of change in the surplus power in a second period of time, which is a given prior period of time, measured from the present time, and shorter than the first period of time, is equal to or smaller than a predetermined threshold value, control the operation of the heat pump to generate heat using power that follows an increase or decrease in the surplus power, and
when the surplus power remains greater than or equal to the predetermined amount of power for the first period of time or longer, and the amount of change in the surplus power in the second period of time is greater than the predetermined threshold value, control the operation of the heat pump to generate heat using power that does not follow the increase or decrease in the surplus power.

14. The heat pump system according to claim 13,
wherein the operation controller is configured to control the operation of the heat pump to generate heat using power that does not follow the increase or decrease in the surplus power, when the amount of change in the surplus power in the second period of time is greater than the predetermined threshold value, and an amount of change in the load power is greater than an amount of change in the generated power.

15. The heat pump system according to claim 13,
wherein the operation controller is configured to control the operation of the heat pump to generate heat using the power approximately corresponding to the surplus power last obtained.

16. The heat pump system according to claim 13,
wherein the operation controller is configured to control the operation of the heat pump to cause the heat pump to consume an amount of power adjusted to follow the surplus power obtained, when a first condition is met, the first condition being that the surplus power remains greater than the predetermined amount of power for the first period of time.

17. The heat pump system according to claim 16,
wherein the information obtainer is further configured to obtain, at the predetermined time intervals, an amount of heat in a water storage tank which stores hot water heated by the heat generated by the heat pump, and
the operation controller is configured to control the operation of the heat pump to cause the heat pump to consume the amount of power adjusted to follow the surplus power obtained at the predetermined time intervals, when a second condition is met, in addition to the first condition, the second condition being that the amount of heat in the water storage tank last obtained is less than or equal to a predetermined upper limit.

18. The heat pump system according to claim 17,
wherein the operation controller is configured to control the operation of the heat pump to cause the heat pump to consume the amount of power adjusted to follow the surplus power obtained at the predetermined time intervals, when a third condition is met in addition to the first condition and the second condition, the third condition being that the amount of heat in the water storage tank last obtained is greater than a predetermined lower limit.

19. The heat pump system according to claim 13, further comprising:
the heat pump which generates heat;
a water storage tank which stores hot water; and
a heat exchanger which heats the hot water stored in the water storage tank with the heat generated by the heat pump,
wherein the operation controller is further configured to:
obtain an ambient temperature, which is a temperature surrounding the heat pump, an inlet water temperature, which is a temperature of the hot water flowing through the heat exchanger from the water storage tank, and a heated water temperature, which is a temperature of the hot water supplied to the water storage tank from the heat exchanger;
obtain control parameters, the control parameters (i) causing the heat pump to consume an amount of power adjusted to follow the surplus power obtained at the predetermined time intervals, and (ii) causing the heat pump to increase the temperature of the hot water from the inlet water temperature to the heated water temperature; and control the operation of the heat pump according to the obtained control parameters.

20. The heat pump system according to claim 19,
wherein the operation controller is configured to obtain the control parameters corresponding to input information including the amount of power consumed by the heat pump, the ambient temperature, the inlet water temperature, and the heated water temperature, by referring to a control table holding the input information and the control parameters corresponding to a combination of the input information.

21. The heat pump system according to claim 20,
wherein discrete values of the input information are held in the control table, and
the operation controller is configured to, when the combination of the obtained input information is not held in the control table, obtain the control parameters which correspond to the combination of the obtained input information by linear interpolation based on a plurality of the control parameters held in the control table.

22. The heat pump system according to claim 18,
wherein the operation controller is configured to control the operation of the heat pump to cause the heat pump to consume an amount of power comparable to a rated power of the heat pump when at least one of the first condition, the second condition, and the third condition is not met.

23. The heat pump system according to claim 13, further comprising:
a heat pump hot water supply device which includes the heat pump, a water storage tank which stores hot water, a heat exchanger which heats the hot water stored in the water storage tank with the heat generated by the heat pump, and a heat pump controller; and
a heat pump control device which includes the information obtainer and the operation controller, and which is structurally separate from the heat pump hot water supply device.

24. A heat pump system comprising:
a heat pump that generates heat using power generated by a power generation device; and
a heat pump control device that controls the heat pump,
wherein the heat pump control device includes:
an information obtainer configured to obtain an amount of the power generated by the power generation device, an amount of load power, and a status of a power grid; and
an operation controller configured to calculate a power consumption command value using a surplus power calculated based on the amount of power generated and the amount of load power, and
the operation controller is further configured to:
calculate the power consumption command value to follow the surplus power, when the surplus power remains greater than or equal to a first threshold value for a first period of time or longer, which is a given prior period of time, measured from a present time;
when an amount of change in the surplus power in a second period of time, which is a given prior period of time, measured from the present time, and shorter than the first period of time, is greater than a second threshold value, transmit the power consumption command value previously calculated before the second period of time, to the heat pump, such that the operation of the heat pump is controlled to generate heat using power that does not follow the increase or decrease in the surplus power; and
when the amount of change in the surplus power in the second period of time is less than or equal to the second threshold value, transmit the power consumption command value calculated at the present time to the heat pump, such that the operation of the heat pump is controlled to generate heat using power that follows the increase or decrease in the surplus power.

25. The heat pump system according to claim 24, further comprising a power distribution device,
wherein the power distribution device transmits the amount of power generated by the power generation device and the amount of load power to the information obtainer included in the heat pump control device.

26. The heat pump system according to claim 24, further comprising
a heat pump hot water supply device including the heat pump and a heat pump controller,
wherein the heat pump controller includes a first control table for calculating operation parameters based on the power consumption command value and a second control table for calculating operation control parameters based on rated operation.

* * * * *